United States Patent
Li

(10) Patent No.: US 12,531,784 B2
(45) Date of Patent: Jan. 20, 2026

(54) METHOD FOR DEPLOYING VIRTUALIZED NETWORK FUNCTION AND APPARATUS

(71) Applicant: Huawei Technologies Co., Ltd., Shenzhen (CN)

(72) Inventor: Shitao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 58 days.

(21) Appl. No.: 18/640,900

(22) Filed: Apr. 19, 2024

(65) Prior Publication Data

US 2024/0267295 A1  Aug. 8, 2024

Related U.S. Application Data

(63) Continuation of application No. PCT/CN2022/125730, filed on Oct. 17, 2022.

(30) Foreign Application Priority Data

Oct. 20, 2021  (CN) .......................... 202111221826.7

(51) Int. Cl.
G06F 15/16 (2006.01)
H04L 41/0895 (2022.01)
H04L 47/70 (2022.01)

(52) U.S. Cl.
CPC .......... H04L 41/0895 (2022.05); H04L 47/82 (2013.01)

(58) Field of Classification Search
CPC .............................. H04L 41/0895; H04L 47/82
(Continued)

(56) References Cited

U.S. PATENT DOCUMENTS 8,752,047 B2 * 6/2014 Banga ................. G06F 9/45533
  718/1
9,923,926 B1 * 3/2018 Banga ................... G06F 9/3891
(Continued)

FOREIGN PATENT DOCUMENTS

CN    111949364 A    11/2020
JP    7377965 B2    11/2023

OTHER PUBLICATIONS

"Network Functions Virtualisation (NFV); Release 4 Architectural Framework; Report on network connectivity for container based VNF", Draft ETSI GR NFV-IFA 038 V0.7.0, European Telecommunications Standards Institute (ETSI), 650, Route Deslucioles; F-06921 Sophia-Antipolis; France vol. ISG-NFV, Aug. 3, 2021 (Aug. 3, 2021), pp. 1-40, XP014422117.
(Continued)

*Primary Examiner* — Moustafa M Meky
(74) *Attorney, Agent, or Firm* — Slater Matsil, LLP

(57) ABSTRACT

This application provides a method for deploying a virtualized network function and an apparatus. A VNFM determines first resource information of a resource pre-allocated to the external connection point of the load balancer and/or the external name, and sends the first resource information to a container infrastructure service management CISM. The CISM may create the external connection point of the load balancer and/or the external name based on a partial of or the entire of the resource indicated by the first resource information. A mechanism of deploying a plurality of types of services in the VNF to serve as external connection points is provided.

20 Claims, 9 Drawing Sheets

(58) Field of Classification Search
USPC .......................................................... 709/220
See application file for complete search history.

(56) References Cited

U.S. PATENT DOCUMENTS

| | | | |
|---|---|---|---|
| 10,417,049 B2* | 9/2019 | Pan | G06F 9/5027 |
| 10,516,623 B2* | 12/2019 | Leafe | G06F 9/00 |
| 10,893,425 B2* | 1/2021 | Baillargeon | H04W 24/02 |
| 10,897,467 B2* | 1/2021 | Celozzi | H04L 63/107 |
| 10,944,635 B2* | 3/2021 | Yousaf | H04L 41/0895 |
| 11,265,222 B2* | 3/2022 | Yousaf | G06F 9/45558 |
| 11,461,154 B2* | 10/2022 | Kuo | G06F 9/547 |
| 11,805,075 B2* | 10/2023 | Senarath | H04L 41/0806 |
| 12,212,457 B2* | 1/2025 | Blau | H04L 41/0806 |
| 12,229,576 B2* | 2/2025 | Melkild | G06F 9/45516 |
| 12,369,049 B2* | 7/2025 | Martin de Nicolas | H04L 41/0806 |
| 2014/0064270 A1 | 3/2014 | Kapadia et al. | |
| 2019/0132330 A1* | 5/2019 | Celozzi | H04L 63/107 |
| 2019/0253261 A1* | 8/2019 | Gero | H04L 9/3013 |
| 2020/0012510 A1* | 1/2020 | Andrianov | G06F 9/45558 |
| 2020/0067782 A1* | 2/2020 | Yousaf | H04L 41/5051 |
| 2021/0152430 A1* | 5/2021 | Yousaf | H04L 41/122 |
| 2021/0326162 A1* | 10/2021 | Melkild | G06F 9/45516 |
| 2022/0231908 A1* | 7/2022 | Blau | H04L 41/122 |
| 2023/0062410 A1* | 3/2023 | Martin De Nicolas | H04L 41/5054 |
| 2024/0012674 A1* | 1/2024 | Xie | G06F 9/5077 |

OTHER PUBLICATIONS

NEC Corporation, Sheel Rana et al: "SOL018 Clause 6.2.3 Discovery and Loadbalancing", ETSI Draft; NFVSOL (21) 000532R3, European Telecommunications Standards Institute (ETSI), 650, Route Deslucioles; F-06921 Sophia-Antipolis; France vol. ISG-NFV Oct. 18, 2021 (Oct. 18, 2021), pp. 1-3, XP014422274.

Takeshi Hattori et al., "5G Textbook", 1st Edition, Sep. 21, 2018, With English Abstract total 16 pages.

* cited by examiner

METHOD FOR DEPLOYING VIRTUALIZED NETWORK FUNCTION AND APPARATUS

CROSS-REFERENCE TO RELATED APPLICATIONS

This application is a continuation of International Application No. PCT/CN2022/125730, filed on Oct. 17, 2022. The International Application claims priority to Chinese Application No. 202111221826.7, filed on Oct. 20, 2021. The disclosures of the aforementioned applications are hereby incorporated by reference in their entireties.

TECHNICAL FIELD

This application relates to the field of communication technologies, and in particular, to a method for deploying a virtualized network function and an apparatus.

BACKGROUND

The network functions virtualization (NFV) technology uses general-purpose hardware devices and virtualization technologies to construct a virtualized network function (VNF), and uses the VNF to carry functions of dedicated devices on a traditional network, thereby reducing costs caused by deploying dedicated devices.

A container management platform is implemented based on a containerization technology, for example, a K8S (Kubernetes) platform. One container management platform manages one cluster, where the cluster includes several physical machines or virtual machines. A physical machine or a virtual machine may be considered as a node. Correspondingly, a container is deployed on a physical machine or a virtual machine. The container management platform creates containers in a managed cluster by using a pod as a minimum unit. One pod may include one or more containers. The cluster further includes services, where one service may access one or more pods in the cluster. An external node may access the one or more pods through the service.

With continuous development of the containerization technology, the container management platform is introduced into an NFV architecture. In this way, one or more pods may be deployed in a VNF. In an NFV architecture where the container management platform is introduced, an external connection point (ExtCp) is defined, and a service may be used as an ingress for accessing a pod in the NFV by an external node. The external node may be understood as a node other than the VNF. However, there is not yet a solution for deploying services in the NFV architecture as external connection points.

SUMMARY

Embodiments of this application provide a method for deploying a virtualized network function and an apparatus, to provide a mechanism of deploying services in a VNF to serve as external connection points.

According to a first aspect, an embodiment of this application provides a method for deploying a virtualized network function. The method may be performed by a container infrastructure service management (CISM), or may be performed by a chip system or a communication system having functions of a CISM. For ease of description, the following uses an example in which the CISM executes the method for description. The method includes: receiving first resource information, where the first resource information indicates a resource pre-allocated to an external connection point of a first type, the external connection point is an ingress for accessing a virtualized network function VNF by an external node, and the first type includes a load balancer and/or an external name; and creating the external connection point of the first type, and allocating a partial of or the entire of the resource indicated by the first resource information to the external connection point of the first type.

In this embodiment of this application, the CISM receives the first resource information of the resource pre-allocated to the external connection point of the first type, creates the external connection point of the first type, and allocate a partial of or the entire of the resource indicated by the first resource information to the external connection point of the first type. A mechanism of deploying services of a load balancer and/or an external name in the VNF to serve as external connection points is provided. The services of the load balancer and/or the external name to serve as external connection points may be deployed in the VNF, so that the VNF can support more types of external connection points. In addition, service ranges that can be supported by different types of external connection points may be different, and the VNF may support a plurality of types of external connection points; therefore, the service range supported by the VNF can be extended. In addition, because resources required for deploying different types of external connection points may be different, resources that can be used for deploying the external connection points are enriched.

In a possible implementation, the creating the external connection point of the first type, and allocating a partial of or the entire of the resource indicated by the first resource information to the external connection point of the first type includes: receiving a resource creation request from a virtualized network function manager VNFM, where the resource creation request is used to request to create the external connection point of the first type, and the resource creation request includes second resource information; and if a resource indicated by the second resource information is a subset of the resource indicated by the first resource information, creating the external connection point of the first type, and allocating the resource indicated by the second resource information to the external connection point of the first type.

In this implementation, the CISM receives the second resource information from the VNFM, and the CISM determines, based on the second resource information, a resource used to create the external connection point of the first type. The CISM does not need to determine, from the resource indicated by the first resource information, the resource specifically allocated to the external connection point of the first type. Therefore, a process in which the CISM creates the external connection point of the first type is simplified. In addition, the CISM may verify whether the resource indicated by the second resource information belongs to the subset of the resource indicated by the first resource information, to ensure correctness of the resource indicated by the second resource information. In addition, the VNFM may further carry the second resource information in the resource creation request and send the resource creation request to the CISM. The CISM does not need to receive the second resource information from the VNFM through a dedicated message, thereby reducing a quantity of interactions between the CISM and the VNFM.

In a possible implementation, the CISM sends address information of the container infrastructure service management CISM to a network functions virtualization orchestrator NFVO, where the address information of the CISM indicates the CISM that creates the external connection point of the first type.

In this implementation, the CISM sends the address information of the CISM to the NFVO, and the NFVO may subsequently send the address information of the CISM to the VNFM. In this way, the VNFM communicates with the CISM based on the address information of the CISM. The VNFM does not need to perform a process of discovering the CISM, thereby reducing communication steps between the VNFM and the CISM.

According to a second aspect, an embodiment of this application provides a method for deploying a virtualized network function. The method may be performed by an NFVO, or may be performed by a chip system or a communication system having functions of an NFVO. For ease of description, the following uses an example in which the NFVO executes the method for description. The method includes: determining first resource information, where the first resource information indicates a resource pre-allocated to an external connection point of a first type, the external connection point is an ingress for accessing a virtualized network function VNF by an external node, and the first type is a load balancer and/or an external name; and sending the first resource information to a container infrastructure service management CISM, where the resource indicated by the first resource information is used to create the external connection point of the first type.

In this embodiment of this application, the NFVO determines the first resource information, and sends the first resource information to the CISM. A manner of indicating a resource required by the external connection point of the first type is provided. In addition, the CISM may subsequently allocate, to the external connection point of the first type, a partial of or the entire of the resource indicated by the first resource information, so that the CISM deploys services of the load balancer and/or the external name to serve as external connection points. The CISM does not need to determine the first resource information by itself, thereby reducing an amount of processing by the CISM.

In a possible implementation, the first resource information includes information about an address allocated to the external connection point of the first type. Alternatively, the first resource information further includes information about a function supported by the external connection point of the first type.

In this implementation, the first resource information includes the information about the address. Subsequently, the CISM may allocate an address indicated by the information about the address to the external connection point of the first type, so that the external node can access the external connection point based on the address. A manner in which the external node discovers the external connection point of the first type is provided. In addition, the first resource information may further include the information about the function supported by the external connection point of the first type. In this way, subsequently, the CISM may create, based on the information about the function, the external connection point of the first type that better meets a function requirement.

In a possible implementation, an instantiation request is sent to a VNFM, where the instantiation request is used to request to instantiate the VNF. A resource authorization request is received from the VNFM, where the resource authorization request includes a first resource parameter, and the first resource parameter is used to determine the first resource information. The first resource information is determined based on the first resource parameter.

In this implementation, the VNFM determines the first resource parameter, and sends the first resource parameter to the NFVO. The NFVO does not need to determine the first resource parameter by itself, thereby reducing an amount of processing by the NFVO.

In a possible implementation, a first resource parameter is determined from a virtualized network function descriptor VNFD corresponding to the VNF, where the first resource parameter is used to determine the first resource information, and the VNFD includes type information of the external connection point of the VNF and a resource parameter corresponding to each type of external connection point. The first resource information is determined based on the first resource parameter.

In this implementation, the NFVO determines by itself the first resource parameter from the VNFD, and determines the first resource information based on the first resource parameter. The VNFM does not need to determine the first resource parameter, thereby reducing an amount of processing by the VNFM. In addition, the VNFD is generally configured in the NFVO, and the NFVO parses the VNFD by itself. In this case, the NFVO does not need to send the VNFD to the VNFM, thereby reducing a quantity of interactions between the VNFM and the NFVO.

In a possible implementation, second resource information is sent to the VNFM, where a resource indicated by the second resource information is a subset of the resource indicated by the first resource information, and the resource indicated by the second resource information is used to create the external connection point of the first type.

In this implementation, the NFVO may determine the second resource information, and send the second resource information to the VNFM. Subsequently, the VNFM may send the second resource information to the CISM. This is equivalent to that the NFVO may explicitly indicate, to the CISM, a resource allocated to the external connection point of the first type. The CISM does not need to determine specific resources to be used from the resource indicated by the first resource information, thereby reducing an amount of processing by the CISM.

In a possible implementation, address information of the CISM is received from the CISM, and the address information of the CISM is sent to the VNFM, where the address information of the CISM indicates the CISM that creates the external connection point of the first type.

In this implementation, the CISM may send the address information of the CISM to the NFVO, and the NFVO may subsequently send the address information of the CISM to the VNFM. In this way, the VNFM may directly communicate with the CISM based on the address information of the CISM, thereby simplifying a communication process between the VNFM and the CISM.

According to a third aspect, an embodiment of this application provides a method for deploying a virtualized network function. The method may be performed by a VNFM, or may be performed by a chip system or a communication system having functions of a VNFM. For ease of description, the following uses an example in which the VNFM executes the method for description. The method includes: receiving an instantiation request from a network functions virtualization orchestrator NFVO, where the instantiation request is used to request to instantiate a virtualized network function VNF; and sending a resource authorization request to the NFVO, where the resource authorization request includes a first resource parameter, the first resource parameter is used to determine first resource information, the first resource information indicates a resource pre-allocated to an external connection point of a first type, and the external connection point is an ingress for accessing the virtualized network function VNF by an external node.

In this embodiment of this application, the VNFM may determine the first resource parameter, and send the first resource parameter to the NFVO, so that a manner of determining the first resource parameter is provided. The NFVO does not need to determine the first resource parameter by itself, thereby reducing an amount of processing by the NFVO.

In a possible implementation, the first resource parameter is determined from a VNFD corresponding to the VNF, where the first resource parameter is used to determine the first resource information, and the VNFD includes type information of the external connection point of the VNF and a resource parameter corresponding to each type of external connection point.

In this implementation, the VNFM may parse the VNFD to determine the first resource parameter. A manner of determining the first resource parameter by the VNFM is provided.

In a possible implementation, second resource information is received from the network functions virtualization orchestrator NFVO, where the second resource information indicates the resource pre-allocated to the external connection point of the first type, the external connection point is the ingress for accessing the virtualized network function VNF by the external node, and the first type is a load balancer and/or an external name; and the second resource information is sent to a container infrastructure service management CISM, where the resource indicated by the second resource information is used to create the external connection point of the first type.

In this implementation, the VNFM may receive the second resource information from the NFVO, and send the second resource information to the CISM. In this way, the CISM may determine, based on the second resource information, which resources are to be allocated to the external connection point of the first type. This CISM does not need to determine specific resources to be used from the resource indicated by the first resource information, thereby reducing an amount of processing by the CISM.

According to a fourth aspect, an embodiment of this application provides a method for deploying a virtualized network function. The method may be performed by a VNFM, or may be performed by a chip system or a communication system having functions of a VNFM. For ease of description, the following uses an example in which the VNFM executes the method for description. The method includes: receiving second resource information from the network functions virtualization orchestrator NFVO, where the second resource information indicates the resource pre-allocated to the external connection point of the first type, the external connection point is the ingress for accessing the virtualized network function VNF by the external node, and the first type is a load balancer and/or an external name; and sending the second resource information to a container infrastructure service management CISM, where the resource indicated by the second resource information is used to create the external connection point of the first type.

In a possible implementation, an instantiation request is received from a network functions virtualization orchestrator NFVO, where the instantiation request is used to request to instantiate a virtualized network function VNF; and a resource authorization request is sent to the NFVO, where the resource authorization request includes a first resource parameter, the first resource parameter is used to determine first resource information, the first resource information indicates a resource pre-allocated to an external connection point of a first type, and the external connection point is an ingress for accessing the virtualized network function VNF by an external node.

In a possible implementation, the first resource parameter is determined from a VNFD corresponding to the VNF, where the first resource parameter is used to determine the first resource information, and the VNFD includes type information of the external connection point of the VNF and a resource parameter corresponding to each type of external connection point.

In addition, for other technical effects brought by the fourth aspect or some implementations of the fourth aspect, refer to descriptions of technical effects of the third aspect or corresponding embodiments.

According to a fifth aspect, an embodiment of this application provides a method for deploying a virtualized network function. The method may be performed by a communication system including a VNFM, a CISM, and an NFVO, or may be performed by a communication system having functions of a VNFM, a CISM, and an NFVO. For ease of description, the following uses an example in which the communication system includes the VNFM, the CISM, and the NFVO for description. The method includes: A virtualized network function manager VNFM receives an instantiation request from a network functions virtualization orchestrator NFVO, where the instantiation request is used to request to instantiate the VNF. The VNFM sends a resource authorization request to the NFVO, where the resource authorization request includes a first resource parameter, the first resource parameter is used to determine first resource information, the first resource information indicates a resource pre-allocated to an external connection point of a first type, and the external connection point is an ingress for accessing the virtualized network function VNF by an external node. The NFVO determines the first resource information, where the first resource information indicates the resource pre-allocated to the external connection point of the first type, the external connection point is the ingress for accessing the virtualized network function VNF by the external node, and the first type is a load balancer and/or an external name. The NFVO sends the first resource information to a container infrastructure service management CISM, where the resource indicated by the first resource information is used to create the external connection point of the first type. The CISM creates the external connection point of the first type, and allocates a partial of or the entire of the resource indicated by the first resource information to the external connection point of the first type.

In this embodiment of this application, after receiving the instantiation request, the VNFM may determine the first resource parameter required for deploying the external connection point of the first type in the VNF, and send the first resource parameter to the NFVO. The NFVO determines the first resource information based on the first resource parameter, to send the first resource information to the CISM. The CISM receives and creates the external connection point of the first type. A mechanism of deploying services of a load balancer and/or an external name in the VNF to serve as external connection points is provided. In addition, the VNFM determines the first resource parameter. The NFVO does not need to determine the first resource parameter, thereby reducing an amount of processing by the NFVO.

In addition, for other technical effects brought by the fifth aspect, refer to descriptions of technical effects of the first aspect, the second aspect, the third aspect, or corresponding embodiments.

According to a sixth aspect, an embodiment of this application provides a method for deploying a virtualized network function. The method may be performed by a communication system including a VNFM, a CISM, and an NFVO, or may be performed by a communication system having functions of a VNFM, a CISM, and an NFVO. The method includes: A network functions virtualization orchestrator NFVO determines first resource information, where the first resource information indicates a resource pre-allocated to an external connection point of a first type, the external connection point is an ingress for accessing a virtualized network function VNF by an external node, and the first type is a load balancer and/or an external name. The network functions virtualization orchestrator NFVO sends the first resource information to a container infrastructure service management CISM, where the resource indicated by the first resource information is used to create the external connection point of the first type. A virtualized network function manager VNFM receives second resource information from the NFVO, where the second resource information indicates the resource pre-allocated to the external connection point of the first type, the external connection point is the ingress for accessing the virtualized network function VNF by the external node, and the first type is the load balancer and/or the external name. The second resource information is sent to the container infrastructure service management CISM, where the resource indicated by the second resource information is used to create the external connection point of the first type. The CISM receives a resource creation request from the VNFM, where the resource creation request is used to request to create the external connection point of the first type, and the resource creation request includes the second resource information. If the resource indicated by the second resource information is a subset of the resource indicated by the first resource information, the CISM creates the external connection point of the first type, and allocates the resource indicated by the second resource information to the external connection point of the first type.

In this embodiment of this application, the NFVO may determine the first resource information, and sends the first resource information to the CISM. In addition, the NFVO may further determine the second resource information, and the VNFM may send the second resource information to the CISM. When deploying the external connection point of the first type, the CISM may deploy the external connection point of the first type based on the resource indicated by the second resource information. A mechanism of deploying services of a load balancer and/or an external name in the VNF to serve as external connection points is provided. Because the NFVO may directly specify that the external connection point of the first type is created, the CISM does not need to determine, from the resource indicated by the first resource information, specific resources to be used to create the external connection point of the first type. Therefore, a process in which the CISM deploys the external connection point of the first type is relatively simplified.

In addition, for other technical effects brought by the sixth aspect, refer to descriptions of technical effects of the first aspect, the second aspect, the third aspect, or corresponding embodiments.

According to a seventh aspect, an embodiment of this application provides a communication apparatus. The communication apparatus may be the CISM in the first aspect, or an electronic device (for example, a chip system) configured in the CISM, or a relatively large device including the CISM. The CISM includes a corresponding means or module configured to perform the first aspect or any optional implementation. For example, the communication apparatus includes a processing module (also referred to as a processing unit sometimes) and a transceiver module (also referred to as a transceiver unit sometimes).

For example, the transceiver module is configured to receive first resource information, where the first resource information indicates a resource pre-allocated to an external connection point of a first type, the external connection point is an ingress for accessing a virtualized network function VNF by an external node, and the first type includes a load balancer and/or an external name. The processing module is configured to create the external connection point of the first type, and allocating a partial of or the entire of the resource indicated by the first resource information to the external connection point of the first type.

In an optional implementation, the communication apparatus includes a processor, coupled to a memory, and configured to execute instructions in the memory, to implement the method performed by a fifth network element in the first aspect or the implementations. Optionally, the communication apparatus further includes another component, for example, an antenna, an input/output module, an interface, and the like. These components may be hardware, software, or a combination of software and hardware.

For other technical effects brought by the seventh aspect or some implementations of the seventh aspect, refer to descriptions of technical effects of the first aspect or corresponding embodiments.

According to an eighth aspect, an embodiment of this application provides a communication apparatus. The communication apparatus may be the NFVO in the second aspect, or an electronic device (for example, a chip system) configured in the NFVO, or a relatively large device including the NFVO. The NFVO includes a corresponding means or module configured to perform the second aspect or any optional implementation. For example, the communication apparatus includes a processing module (also referred to as a processing unit sometimes) and a transceiver module (also referred to as a transceiver unit sometimes).

For example, the processing module is configured to determine first resource information, where the first resource information indicates a resource pre-allocated to an external connection point of a first type, the external connection point is an ingress for accessing a virtualized network function VNF by an external node, and the first type is a load balancer and/or an external name. The transceiver module is configured to send the first resource information to a CISM, where the resource indicated by the first resource information is used to create the external connection point of the first type.

In an optional implementation, the communication apparatus includes a processor, coupled to a memory, and configured to execute instructions in the memory, to implement the method performed by a fifth network element in the first aspect or the implementations. Optionally, the communication apparatus further includes another component, for example, an antenna, an input/output module, an interface, and the like. These components may be hardware, software, or a combination of software and hardware.

For other technical effects brought by the eighth aspect or some implementations of the eighth aspect, refer to descriptions of technical effects of the second aspect or corresponding embodiments.

According to a ninth aspect, an embodiment of this application provides a communication apparatus. The communication apparatus may be the VNFM in the third aspect, or an electronic device (for example, a chip system) configured in the VNFM, or a relatively large device including the VNFM. The VNFM includes a corresponding means or module configured to perform the first aspect or any optional implementation. For example, the communication apparatus includes a transceiver module (also referred to as a transceiver unit sometimes). Optionally, the communication apparatus further includes a processing module (also referred to as a processing unit sometimes).

For example, the transceiver module is configured to: receive an instantiation request from a network functions virtualization orchestrator NFVO, where the instantiation request is used to request to instantiate a virtualized network function VNF; and send a resource authorization request to the NFVO, where the resource authorization request includes a first resource parameter, the first resource parameter is used to determine first resource information, the first resource information indicates a resource pre-allocated to an external connection point of a first type, and the external connection point is an ingress for accessing the virtualized network function VNF by an external node.

Optionally, the processing module is configured to determine the first resource parameter from a VNFD corresponding to the VNF, where the first resource parameter is used to determine the first resource information, and the VNFD includes type information of the external connection point of the VNF and a resource parameter corresponding to each type of external connection point.

In an optional implementation, the communication apparatus includes a processor, coupled to a memory, and configured to execute instructions in the memory, to implement the method performed by a fifth network element in the first aspect or the implementations. Optionally, the communication apparatus further includes another component, for example, an antenna, an input/output module, an interface, and the like. These components may be hardware, software, or a combination of software and hardware.

For other technical effects brought by the ninth aspect or some implementations of the ninth aspect, refer to descriptions of technical effects of the third aspect or corresponding embodiments.

According to a tenth aspect, an embodiment of this application provides a communication apparatus. The communication apparatus may be the VNFM in the fourth aspect, or an electronic device (for example, a chip system) configured in the VNFM, or a relatively large device including the VNFM. The VNFM includes a corresponding means (means) or module configured to perform the first aspect or any optional implementation. For example, the communication apparatus includes a transceiver module (also referred to as a transceiver unit sometimes). Optionally, the communication apparatus further includes a processing module (also referred to as a processing unit sometimes).

For example, the transceiver module is configured to receive second resource information from a network functions virtualization orchestrator NFVO, where the second resource information indicates the resource pre-allocated to the external connection point of the first type, the external connection point is the ingress for accessing the virtualized network function VNF by the external node, and the first type is a load balancer and/or an external name; and send the second resource information to a container infrastructure service management CISM, where the resource indicated by the second resource information is used to create the external connection point of the first type.

Optionally, the processing module is configured to determine the first resource parameter from a VNFD corresponding to the VNF, where the first resource parameter is used to determine the first resource information, and the VNFD includes type information of the external connection point of the VNF and a resource parameter corresponding to each type of external connection point.

In an optional implementation, the communication apparatus includes a processor, coupled to a memory, and configured to execute instructions in the memory, to implement the method performed by a fifth network element in the first aspect or the implementations. Optionally, the communication apparatus further includes another component, for example, an antenna, an input/output module, an interface, and the like. These components may be hardware, software, or a combination of software and hardware.

For other technical effects brought by the tenth aspect or some implementations of the tenth aspect, refer to descriptions of technical effects of the fourth aspect or corresponding embodiments.

According to an eleventh aspect, an embodiment of this application provides a communication system. The communication system includes the communication apparatus according to the seventh aspect, the eighth aspect, and the ninth aspect. Alternatively, the communication system includes the communication apparatus according to the seventh aspect, the eighth aspect, and the tenth aspect.

According to a twelfth aspect, an embodiment of this application provides a chip system. The chip system includes a processor and an interface. The processor is configured to invoke instructions from the interface and run the instructions. When the processor executes the instructions, the method according to the first aspect, the second aspect, the third aspect, the fourth aspect, the fifth aspect, or the sixth aspect is implemented.

According to a thirteenth aspect, a computer-readable storage medium is provided. The computer-readable storage medium is configured to store a computer program or instructions. When the computer program or instructions are run, the method according to the first aspect, the second aspect, the third aspect, the fourth aspect, the fifth aspect, or the sixth aspect is implemented.

According to a fourteenth aspect, a computer program product including instructions is provided. When the computer program product runs on a computer, the method according to the first aspect, the second aspect, the third aspect, the fourth aspect, the fifth aspect, or the sixth aspect is implemented.

DETAILED DESCRIPTION OF ILLUSTRATIVE EMBODIMENTS

Figure 1A:
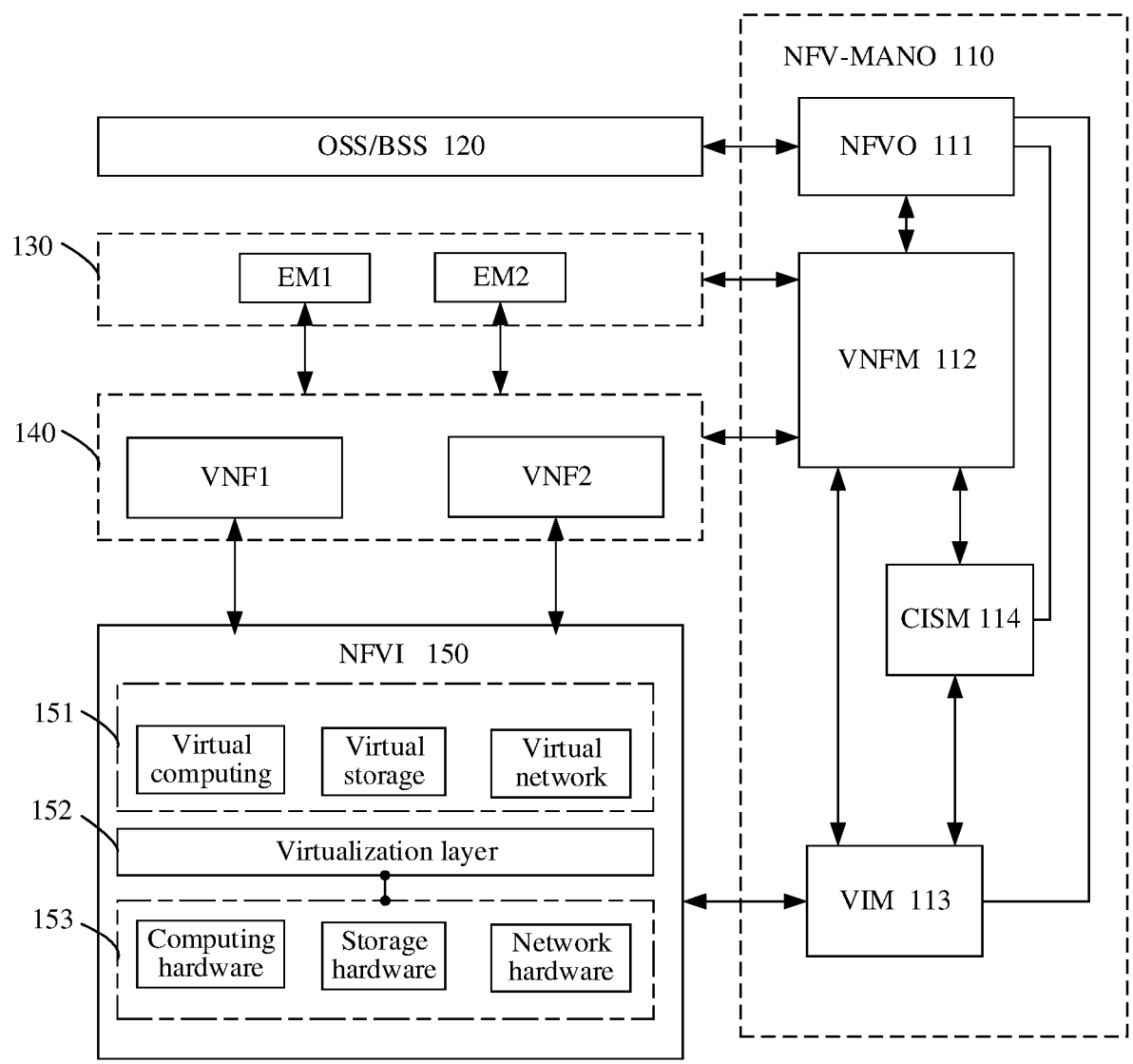
FIG. 1A is a schematic diagram of an NFV architecture to which an embodiment of this application is applicable.

To make the objectives, technical solutions, and advantages of embodiments of this application clearer, the following describes the technical solutions in embodiments of this application in detail with reference to the accompanying drawings of this specification and specific implementations.

The following explains terms used in embodiments of this application.

1. A network element in embodiments of this application is a physical device in a network, or may be an apparatus integrating a plurality of physical devices. The network element in embodiments of this application may alternatively be a logical concept, for example, a software module in a physical device, or a network function corresponding to a service provided by each network device. The network function may be understood as a virtualization function implemented by using a virtualization technology.

2. A connection point in embodiments of this application may be understood as an interface of a VNF. Connection points include an internal connection point and an external connection point. The internal connection point is, for example, a virtualization deployment unit connection point (VDU Cp), and may be used for internal communication of the VNF. For example, the VNF includes at least one VNF component (VNFC). Each VNFC may include one or more internal connection points, and the VNFCs may communicate with each other through the internal connection points. An external connection node is used for communication between the VNF and an external node. The external connection point may be a virtual connection point (virtual Cp) type. The virtual connection point may be implemented using a service. The service includes a node port, a load balancer, an external name, and other types. The node port, the load balancer, and the external name may be further understood as three technologies for implementing the service. Correspondingly, an external connection point of a node port in embodiments of this application may also be referred to as a virtual connection point of the node port, a service of the node port, or an external connection point implemented by using a node port technology. An external connection point of a load balancer in embodiments of this application may also be referred to as a virtual connection point of the load balancer, a service of the load balancer, or an external connection point implemented by using a load balancer technology. An external connection point of an external name in embodiments of this application may also be referred to as a virtual connection point of the external name, a service of the external name, or an external connection point implemented by using an external name technology.

In embodiments of this application, a CISM in the NFV architecture may pre-configure different information for different types of services, to implement functions of the external connection point. For example, for the service of the node port, the CISM can configure a port on a cluster node managed by the CISM for the service. External nodes can access the service by accessing the port. For the service of the load balancer, information (for example, an Internet protocol (IP) address of the load balancer) about the load balancer provided by a network service vendor may be configured for the service. The external node may access the service through the information about the load balancer. For the service of the external name, the service may be associated with the external name (for example, foo.bar.example.com). The external node accesses the service by accessing the external name.

It should be understood that, in embodiments of this application, three types of external connection points are represented by using the node port, the load balancer, and the external name, and are merely examples rather than limitations. In a standard evolution process, a name of the node port, the load balancer, or the external name may change. This is not limited in embodiments of this application.

3. A virtual deployment unit (VDU) in embodiments of this application is used to describe a unit for deploying the VNF. If the VNF is deployed by using a virtual machine technology, one VDU represents one virtual machine. Alternatively, if the VNF is deployed by using a containerization technology, one VDU represents a group of containers.

4. A virtualized network function descriptor (VNFD) in embodiments of this application may also be referred to as a deployment descriptor of the VNF. The VNFD is generally configured in an NFV orchestrator (NFVO). The VNFD is used to describe the VNF. The VNFD includes information about a virtualization deployment unit (VDU), information about a connection point descriptor (CPD), information about a virtual link descriptor (VLD), and the like. For example, if one VDU represents one virtual machine, the information about the VDU includes description information about resource requirements of the virtual machine, for example, a type of resource required for creating the virtual machine and a quantity of the resource for each type of resource. Alternatively, if one VDU represents a group of containers, the information about the VDU includes description information about resource requirements of the group of containers. The information about the CPD includes type information and a resource parameter for each type of external connection point in the VNF. The type information of the external connection point indicates a type of the external connection point. The resource parameter of the external connection point indicates a resource required for creating the external connection point of this type. The resource parameter of the external connection point includes, for example, an address representation form of the external connection point. The address representation form represents an address by, for example, an Internet protocol address. Optionally, the resource parameter of the external connection point further includes a type of a function supported by the external connection point. The information about the VLD describes a virtual network connection requirement between VDUs, for example, information such as a connection type and/or bandwidth. In an example, if the VNF includes the external connection point of the first type, but the VNFD in the conventional technology actually does not include a related definition of the external connection point of the first type, the type information of the external connection point of the first type in embodiments of this application may be pre-configured in the VNFD corresponding to the VNF. For example, the type information of the external connection point of the first type may be added to the type information of the virtual connection point in the VNFD.

5. The container in embodiments of this application may be understood as a software unit. The container includes a necessary element, for example, a system tool, that enables an application to run smoothly in different environments. The container simplifies application development and deployment.

6. A name space in embodiments of this application is an organization mechanism, for classifying, filtering, and managing objects in a cluster managed by the container management platform, for example, services. Objects added to a cluster may belong to one name space. In a same name space, a name of an object is unique; while in different name spaces, different objects may have a same name.

In embodiments of this application, "a plurality of" means two or more. In view of this, "a plurality of" may also be understood as "at least two" in embodiments of this application. "At least one" may be understood as one or more, for example, one, two, or more. For example, including at least one means including one, two, or more, and which is included is not limited. For example, if at least one of A, B, and C is included, A, B, C, A and B, A and C, B and C, or A and B and C may be included. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. The terms "system" and "network" in embodiments of this application may be used interchangeably.

Unless otherwise specified, ordinal numbers such as "first" and "second" mentioned in embodiments of this application are used to distinguish a plurality of objects, and are not used to limit a sequence, a time sequence, a priority, or an importance degree of the plurality of objects. For example, "first resource information" and "second resource information" in embodiments of this application are used to represent two pieces of resource information, and are not used to limit priorities of the two pieces of resource information.

For ease of understanding, the following briefly describes the concept and architecture of NFV.

1. NFV

The NFV decouples software from hardware, so that functions of a network device no longer depend on dedicated hardware. In addition, a cloud computing feature enables flexible resource sharing, thereby implementing rapid development and deployment of a new service. A network service implemented by using the NFV is referred to as network services (NS). For example, the NS includes an Internet protocol multimedia subsystem (IMS) network service, or a core network service in the 5th generation system (5GS). Each NS includes several virtualized network functions (VNF), in other words, several VNFs implement one NS.

2. NFV Architecture

Refer to FIG. 1A. FIG. 1A is a schematic diagram of an NFV architecture to which an embodiment of this application is applicable, or may be understood as a schematic diagram of an NFV architecture in which a container management platform is introduced. The NFV architecture includes an NFV management and orchestration system (NFV MANO) 110, one or more operation support systems/business support systems (OSS/BSS) 120, one or more element management systems (EMS) 130, a plurality of VNFs 140, and an NFV infrastructure (NFVI) 150.

The NFV MANO 110 is responsible for managing and orchestrating an entire NFVI resource. The NFV MANO 110 includes an NFVO 111, one or more virtualized network function managers (VNFM) 112, a virtualized infrastructure manager (VIM) 113, and a CISM 114.

The NFVO 111 is mainly responsible for managing a life cycle of the NS, allocating hardware resources (for example, computing hardware, storage hardware, and network hardware in FIG. 1A) and virtual resources (for example, virtual computing, virtual storage, and virtual networks in FIG. 1A) in the NFVI 150, scheduling hardware resources and virtual resources in the NFVI, and the like. The NFVO 111 may further communicate with one or more VNFMs 112, to execute a corresponding resource request and the like. In addition, the NFVO 111 may also communicate with a virtualized infrastructure manager (VIM) 113 for resource allocation, reservation, and/or the like.

The VNFM 112 is mainly responsible for life cycle management of one or more VNFs 140. Life cycle management includes instantiating, updating, querying, auto scaling, terminating, and the like, for the VNF140. The VNFM 112 may communicate with the VNF 140, to complete the life cycle management for the VNF, and exchange information about configuration and status. Optionally, there may be a plurality of VNFMs 112, and each VNFM 112 may be responsible for life cycle management for different types of VNFs 140.

The VIM 113 controls and manages interactions between the VNF 140 and a hardware resource or a virtual resource in the NFVI 150. For example, the VIM 113 performs a resource management function, including managing an infrastructure resource, allocating (for example, adding a resource to a container), and running a function (for example, collecting fault information of the NFVI 150). The VNFM 112 and the VIM 113 may communicate with each other, to request to allocate a resource, exchange a virtual resource, and exchange information about status.

The CISM 114 is equivalent to a container management platform in the NFV architecture, and is responsible for managing a container resource, including creating, updating, querying, auto scaling, terminating, and the like, for the container. When the VNF is deployed in the form of a container, the VNFM 112 may communicate with the CISM 114, to request to create a container resource.

The OSS/BSS 120 is mainly oriented to a telecommunication service operator, and provides integrated network management, such as fault monitoring and network information collection, and service operation functions, such as charging management and customer service management.

The EMS 130 is configured to perform conventional functions of fault management, configuration management, account management, performance management, security management (FCAPS) for the VNF 140. The EMS includes one or more EMs (for example, an $EM_1$ and an $EM_2$ in FIG. 1A).

Figure 1B:
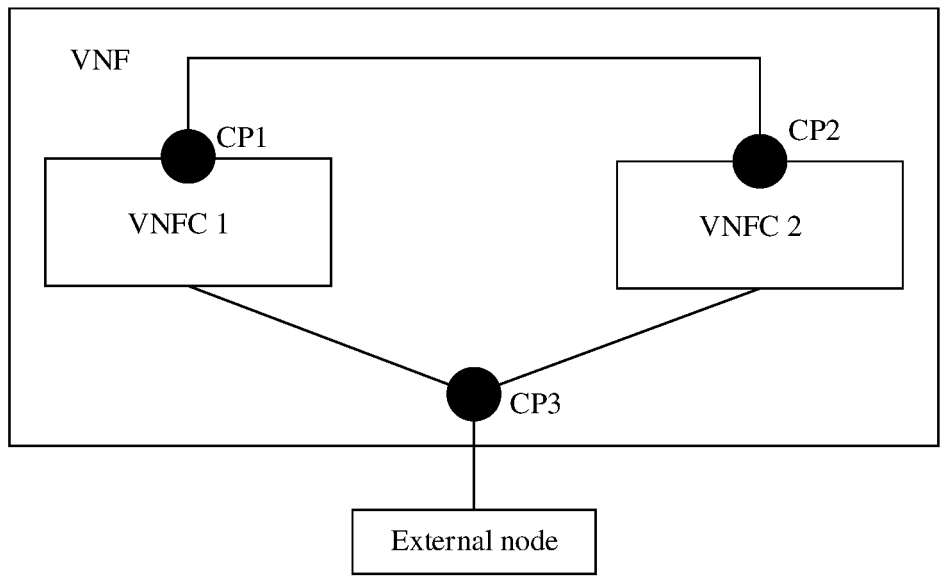
FIG. 1B is a schematic diagram of a structure of a VNF.

The VNF 140 includes one or more VNFCs. The VNF 140 may be implemented by using the virtual machine technology or the containerization technology. If the VNF 140 is implemented by using the virtual machine technology, the VNFC included in the VNF may be deployed on one or more virtual machines. If the VNF 140 is implemented by using the containerization technology, the VNFC included in the VNF may be deployed in one or more containers. Instantiating the VNF may be understood as allocating or creating a resource required by the VNF for implementing a corresponding function. Instantiating the VNF includes creating a virtual machine or a container, and deploying, on the created virtual machine or the container, the VNFC included in the VNF. In addition, instantiating the VNF further includes creating a connection point of the VNF, for example, creating an external connection point in the VNF. To describe a structure of the VNF more clearly, the following describes an example with reference to a schematic diagram of a structure of a VNF shown in FIG. 1B. Referring to FIG. 1B, the VNF includes two VNFCs (a VNFC1 and a VNFC2 shown in FIG. 1B), an internal connection point (a CP1 and a CP2 shown in FIG. 1B), and an external connection point (a CP3 shown in FIG. 1B). The CP1 and the CP2 are configured to implement communication between the VNFC1 and the VNFC2. The CP3 is configured to implement communication between the VNF and an external node, and the like. The two VNFCs in FIG. 1B may be deployed on a virtual machine (not shown in FIG. 1B) or a container (not shown in FIG. 1B).

The NFVI 150 includes a virtual resource layer 151, a virtualization layer 152, and a hardware resource layer 153. The virtual resource layer 151 is configured to provide virtual resources, and the virtual resources include virtual computing, virtual storage, virtual network, and the like shown in FIG. 1A. The virtualization layer 152 may form a virtual network through a hardware resource in a virtualized hardware resource layer. The virtual network is, for example, a virtual local area network (VLAN), a virtual extensible local area network (VXLAN), or the like. The hardware resource layer 153 is configured to provide hardware resources. For example, the hardware resource layer 153 may provide a hardware resource in the form of a physical machine. The hardware resource layer includes computing hardware, storage hardware, network hardware, and the like shown in FIG. 1A.

It should be understood that the network elements (such as the NFVO, the VNFM, the CISM, and the like) described in FIG. 1A are merely examples but not limitations. In a standard evolution process, names of the network elements may change, and functions performed by the network elements may be further split or combined. This is not limited in embodiments of this application.

Figure 1C:
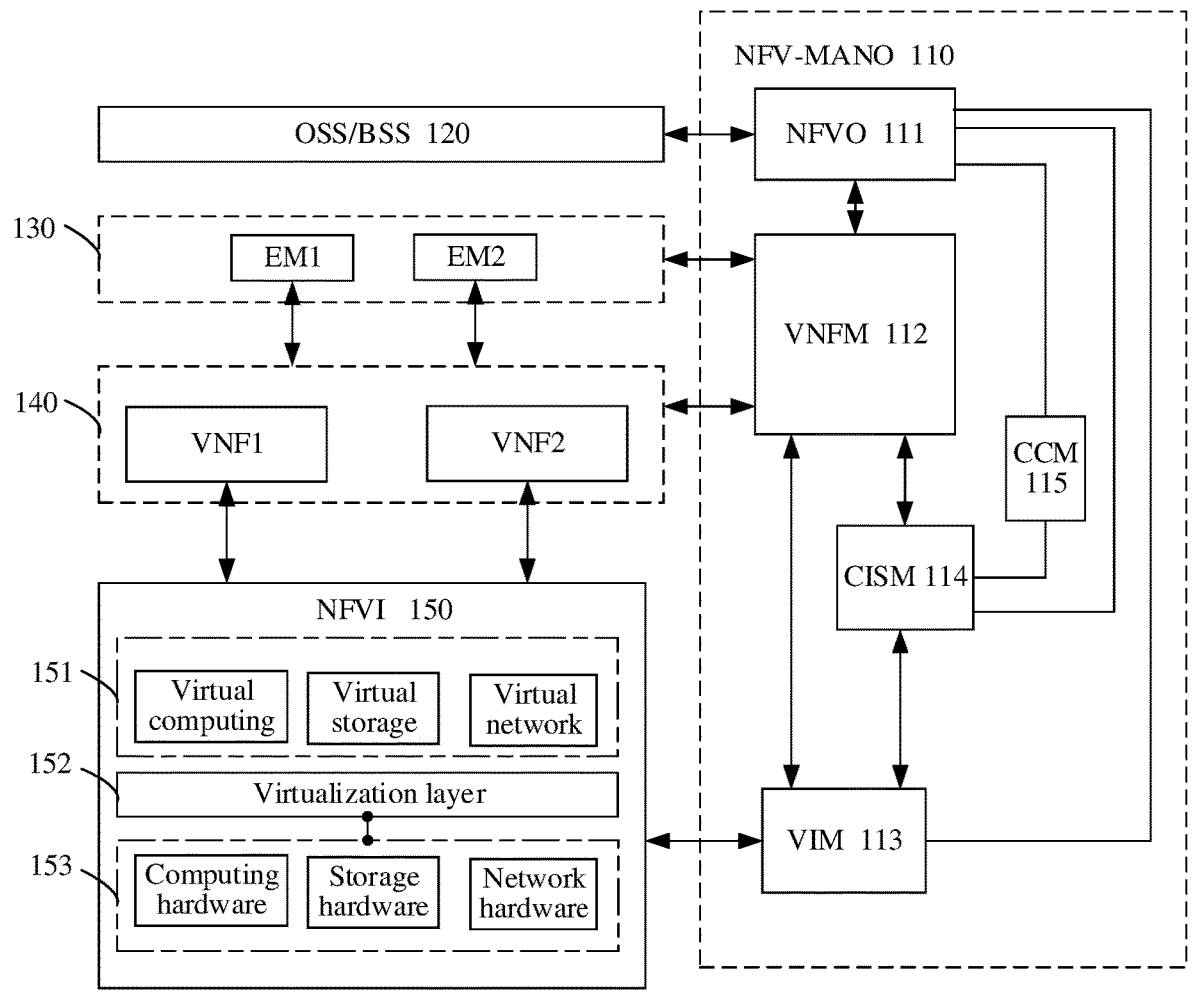
FIG. 1C is a schematic diagram of another NFV architecture to which an embodiment of this application is applicable.

Refer to FIG. 1C. FIG. 1C is a schematic diagram of another NFV architecture to which an embodiment of this application is applicable, or may be understood as a schematic diagram of an NFV architecture in which a container management platform is introduced. Different from FIG. 1A, the NFV architecture shown in FIG. 1C further includes a container cluster manager (CCM) 115. The CCM 115 may communicate with both the NFVO 111 and the CISM 114. The CCM 115 may cooperate with the NFVO 111 to manage the CISM 114. For functions of network elements other than the CCM in FIG. 1C, refer to content described in FIG. 1A. Details are not listed herein again.

It should be understood that the network elements (such as the NFVO, the VNFM, the CISM, the CCM, and the like) described in FIG. 1C are merely examples but not limitations. In a standard evolution process, names of the network elements may change, and functions performed by the network elements may be further split or combined. This is not limited in embodiments of this application.

To support deployment of a service in the VNF to serve as the external connection point, an embodiment of this application provides a technical solution. In this technical solution, if an external connection point of a first type (for example, a load balancer and/or an external name) needs to be deployed in a to-be-instantiated VNF, first resource information of the external connection point of the first type may be determined. The first resource information indicates a resource pre-allocated to create the external connection point of the first type. Subsequently, a partial of or the entire of the resource indicated by the first resource information may be allocated to the external connection point of the first type. A mechanism of deploying services of a load balancer and/or an external name in the VNF to serve as external connection points is provided. In addition, the VNF may support more types of services to serve as external connection points, and resources required for creating different types of services may be different. In this way, a quantity of deployed external connection points is not limited by a quantity of a resource, so that more external connection points are created in the VNF. Therefore, the VNF can meet requirements of more services. In addition, because resources required for creating different types of external connection points may be different, resources for creating external connection points are enriched.

The following describes technical solutions provided in embodiments of this application with reference to the accompanying drawings.

An embodiment of this application provides a method for deploying a virtualized network function. The method may be performed through a communication system.

The communication system may include an NFVO and a CISM, or include an NFVO, a VNFM, and a CISM, or include an apparatus or a chip system that has functions of the NFVO and the CISM, or include a communication apparatus or a chip system that has functions of the NFVO, the VNFM, and the CISM. An implementation of the communication system is not limited in embodiments of this application. The following describes a structure of a communication system by using an example.

Figure 1D:
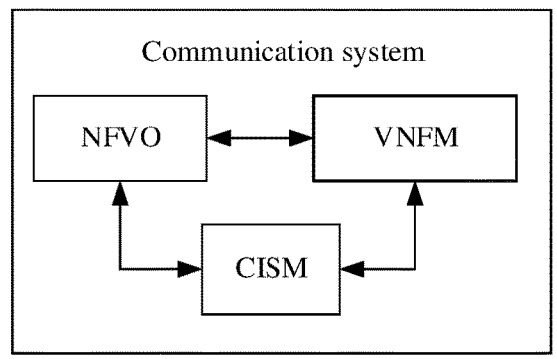
FIG. 1D is a schematic diagram of a structure of a communication system according to an embodiment of this application.

Refer to FIG. 1D. FIG. 1D is a schematic diagram of a structure of a communication system according to an embodiment of this application. The communication system includes an NFVO, a VNFM, and a CISM. The communication system may be deployed in the NFV architecture shown in FIG. 1A or FIG. 1C. The NFVO in the communication system is, for example, the NFVO shown in FIG. 1A or FIG. 1C. The VNFM in the communication system is, for example, the VNFM shown in FIG. 1A or FIG. 1C. The CISM in the communication system is, for example, the CISM shown in FIG. 1A or FIG. 1C. For functions of the NFVO and the CISM in the communication system, refer to the content described in FIG. 1A.

It should be noted that one NFVO, one CISM, and one VNFM are used as an example in FIG. 1D, and actually, quantities of NFVOs, CISMs, and VNFMs are not limited.

Figure 2:
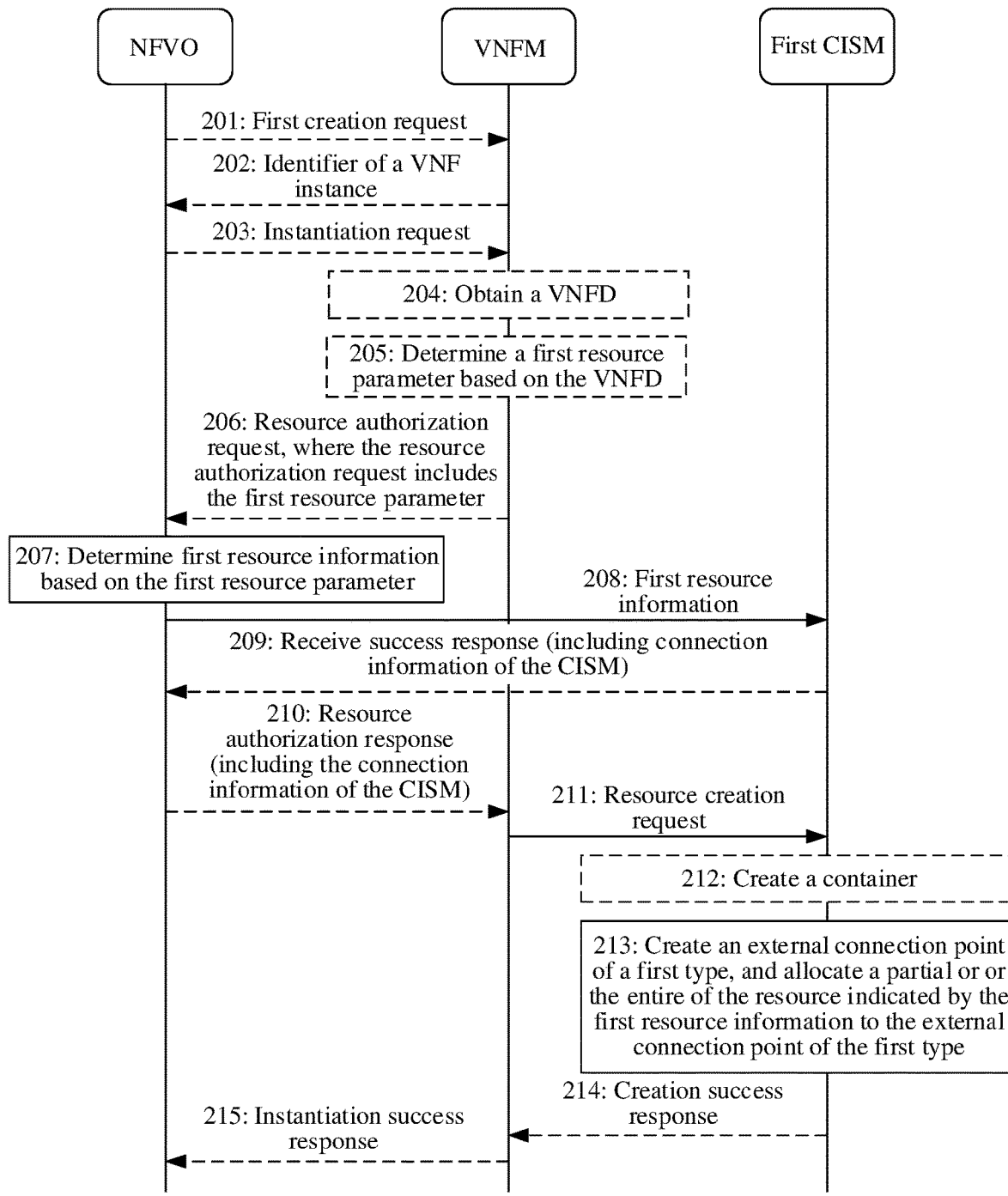
FIG. 2 is a schematic flowchart of a method for deploying a virtualized network function according to an embodiment of this application.

Refer to FIG. 2. FIG. 2 is a flowchart of the method. In description of the process in FIG. 2, the communication system shown in FIG. 1D is used as an example of the communication system, and the communication system is deployed in the NFV architecture shown in FIG. 1A.

Step 201: An NFVO sends a first creation request to a VNFM. Correspondingly, the VNFM receives the first creation request from the NFVO. The first creation request is used to request to create an identifier of a VNF instance.

If a VNF is configured with no resource, the VNF may be referred to as a VNF. If a VNF is configured with a resource, the VNF may be referred to as an instantiated VNF, or may be referred to as a VNF instance. Certainly, if a resource is configured for the VNF in the form of a container, the VNF configured with the resource may also be referred to as a containerized VNF. To facilitate subsequent identification for the VNF, an identifier of the VNF instance may be created during instantiation. For example, the NFVO may send the first creation request to the VNFM, to request the VNFM to create the identifier of the VNF instance.

For example, when a service requester needs to instantiate the VNF, the service requester may send the VNFD to the NFVO, or pre-configure the VNFD in the NFVO. The service requester is, for example, a user or an EM. The VNFD includes an identifier of the VNFD. The identifier of the VNFD indicates the VNFD corresponding to the VNF. For description of the VNFD, refer to the foregoing description. To facilitate the VNFM subsequently obtaining the VNFD corresponding to the VNF, optionally, the first creation request includes the identifier of the VNFD. It should be noted that, in this embodiment of this application, that the NFVO sends the identifier of the VNFD to the VNFM via the first creation request is used as an example. In addition, the NFVO may further send the identifier of the VNFD to the VNFM via another message.

In this embodiment of this application, the VNF may include only the external connection point of the first type. Alternatively, the VNF may further include an external connection point of another type in addition to the external connection point of the first type. For example, the VNF further includes an external connection point of a node port.

Step 202: The VNFM sends the identifier of the VNF instance to the NFVO. Correspondingly, the NFVO receives the identifier of the VNF instance from the VNFM, where the identifier of the VNF instance indicates the VNF instance.

After receiving the first creation request, the VNFM may create the identifier of the VNF instance for the VNF. The VNFM sends the identifier of the VNF instance to the NFVO.

It should be noted that step 201 to step 202 describe an example of a manner in which the NFVO determines the identifier of the VNF instance. In addition, the NFVO may determine the identifier of the VNF instance in a plurality of manners. This is not limited in this embodiment of this application.

Step 203: The NFVO sends an instantiation request to the VNFM. Correspondingly, the VNFM receives the instantiation request from the NFVO. The instantiation request is used to request to instantiate the VNF, and the instantiation request may include the identifier of the VNF instance.

Optionally, the instantiation request further includes information about a VLD and/or information about a VDU. The information about the VLD and the information about the VDU may be determined by the NFVO, for example, determined by the NFVO based on the VNFD. For meanings of the information about the VLD and the information about the VDU, refer to the foregoing description.

Step 204: The VNFM obtains the VNFD.

For example, as described above, the NFVO may be pre-configured with a VNFD corresponding to the VNF. The VNFM may request the VNFD from the NFVO based on the identifier of the VNFD.

For example, the VNFM may send a VNFD request to the VNFM. The VNFD request is used to request to obtain the VNFD. For example, the VNFD request includes the identifier of the VNFD. Correspondingly, the NFVO receives the VNFD request from the VNFM. The NFVO determines a VNFD corresponding to the identifier of the VNFD, and sends the VNFD to the VNFM. Correspondingly, the VNFM receives the VNFD from the NFVO, and obtains the VNFD. For a meaning of the VNFD, refer to the foregoing description.

Step 205: The VNFM determines a first resource parameter based on the VNFD.

The VNFM parses the VNFD, to determine the type information of the external connection point included in the VNF and a resource parameter of each type of external connection point. In this embodiment of this application, that the VNF includes the external connection point of the first type is used as an example. Therefore, after parsing the VNFD, the VNFM correspondingly determines the type information of the external connection point of the first type and the first resource parameter of the external connection point of the first type. The type information of the external connection point may indicate a type of the external connection point. For example, a type indicated by the type information of the external connection point of the first type is a first type. The first type is, for example, a load balancer and/or an external name. The first resource parameter indicates a resource required for creating the external connection point of the first type. For example, the first resource parameter indicates a type of resource to be allocated for creating the external connection point.

If the first type is different, the type information and/or specific content of the resource parameter of the external connection point of the first type that is determined by the VNFM may be different accordingly. The following provides an example for description.

1. If the first type includes the load balancer, the VNFD includes type information of the external connection point of the load balancer and a resource parameter of the external connection point of the load balancer.

The type information of the external connection point of the load balancer indicates that the type of the external connection point is the load balancer. The resource parameter of the external connection point of the load balancer includes, for example, information about an address representation form of the external connection point of the load balancer. For the information about the address representation form of the external connection point of the load balancer, the information about the address representation form indicates that an address of the external connection point of the load balancer is represented by an IP address of a public network (public network) address or an IP address of a private network (private network) address.

Optionally, the resource parameter of the external connection point of the load balancer in the VNFD further includes information about a function type of the external connection point of the load balancer. The information about the function type indicates a type of a function supported by the external connection point of the load balancer. The function supported by the external connection point of the load balancer includes, for example, a health check (health check) function and/or an auto scaling function. The health check function enables the external connection point of the load balancer to report the exception of a pod associated with the external connection point to the CISM. The auto scaling function enables the external connection point of the load balancer to scale the pod associated with the external connection point. For example, the external connection point of the load balancer may add a pod, and manage the added pod, and/or the external connection point of the load balancer may remove the pod.

Table 1 is an example of the resource parameter of the external connection point of the load balancer included in the VNFD according to an embodiment of this application.

TABLE 1

| Parameter name | Data type | Description |
| --- | --- | --- |
| Address type | String | Public network address or private network address |
| Health check function | Boolean value | True or false. "True" indicates that the external connection point of the load balancer supports the health check function. "False" indicates that the external connection point of the load balancer does not support the health check function. |
| Auto scaling function | Boolean value | True or false. "True" indicates that the external connection point of the load balancer supports the auto scaling function. "False" indicates that the external connection point of the load balancer does not support the auto scaling function. |

For example, that the VNFD includes the resource parameters shown in Table 1 is used as an example. The VNFM determines, from the VNFD, the type information of the external connection point of the load balancer in the VNF, where the type is a service, and the sub-type is the load balancer. In this case, the first type includes the sub-type herein. Optionally, the first type may further include the type herein. The first resource parameter includes that the external connection point of the load balancer is represented by the public network address, and the external connection point of the load balancer supports the health check function and the auto scaling function.

2. If the first type includes the external name, the VNFD includes type information of the external connection point of the external name and a resource parameter of the external connection point of the external name.

The type information of the external connection point of the external name indicates that a type of the external connection point is the external name. The resource parameter of the external connection point of the external name includes information about an address representation form. The information about the address representation form of the external connection point of the external name indicates that an address of the external connection point of the external name is represented by a name and a name space applicable to the name. The name is unique in a same name space. Therefore, the name and the name space can be used to uniquely identify an external connection point of an external connection point. Optionally, the resource parameter of the external connection point of the external name may further include information about a function type of the external connection point of the external name. The information about the function type of the external connection point of the external name indicates a type of a function supported by the external connection point of the external name.

Table 2 is an example of the resource parameter of the external connection point of the external name included in the VNFD according to an embodiment of this application.

TABLE 2

| Parameter name | Data type | Description |
| --- | --- | --- |
| Name | String | Specified name |
| Name space | String | Name space to which the name applies |

For example, that the VNFD includes the resource parameter shown in Table 2 is used as an example. The VNFM determines, from the VNFD, the type information of the external connection point of the external name in the VNF, where the type is a service, and the sub-type (sub-type) is the external name. In this case, the first type includes the sub-type herein. Optionally, the first type may further include the type herein. The first resource parameter includes that an address of the external name is represented by a name and a name space.

3. If the first type includes the load balancer and the external name, the VNFD includes type information of the external connection point of the load balancer, a resource parameter of the external connection point of the load balancer, type information of the external connection point of the external name, and a resource parameter of the external connection point of the external name.

For meanings of the type information of the external connection point of the load balancer, the resource parameter of the external connection point of the load balancer, the type information of the external connection point of the external name, and the resource parameter of the external connection point of the external name, refer to the foregoing description.

If the first type includes the load balancer and the external name, the type information of the external connection point of the first type determined by the VNFM based on the VNFD includes the type information of the external connection point of the load balancer and type information of the external connection point of the external name, and the first resource parameter determined by the VNFM based on the VNFD includes the resource parameter of the external connection point of the load balancer and the resource parameter of the external connection point of the external name.

In an example, the VNFM may further determine, from the VNFD, another resource information required for instantiating the VNF, where the another resource information indicates the another resource. The another resource is a resource other than the resource indicated by the first resource parameter in the resources required for instantiation of the VNF. For the another resource information, for example, information about a VDU and/or information about a VLD corresponding to the VNF, refer to the foregoing description for meanings of the information about the VDU and the information about the VLD.

It should be noted that step 204 uses an example in which the VNFM determines the first resource parameter based on the VNFD. In addition, the VNFM may determine the first resource parameter in a plurality of manners. This is not limited in this embodiment of this application. For example, the VNFM may be pre-configured with the first resource parameter corresponding to the VNF, and does not need to determine the first resource parameter based on the VNFD.

Step 206: The VNFM sends a resource authorization request to the NFVO. Correspondingly, the NFVO receives the resource authorization request from the VNFM. The resource authorization request may include the first resource parameter.

A large quantity of resources (for example, the resource indicated by the first resource parameter) may be required for instantiating the VNF. Some of the resources may need to be authorized by the NFVO. For example, the resource indicated by the first resource parameter needs to be authorized by the NFVO. In this embodiment of this application, that the resource indicated by the first resource parameter needs to be authorized by the NFVO is used as an example. The resource indicated by the first resource parameter needs to be authorized by the NFVO. As a result, the VNFM may request, from the NFVO, to authorize the resource indicated by the first resource parameter. For example, the resource authorization request may request the NFVO to authorize the resource indicated by the first resource parameter. The NFVO may determine, based on the first resource parameter included in the resource authorization request, the resource indicated by the first resource parameter that the VNFM requests to authorize, for example, referred to as a first resource.

For example, the NFVO determines, based on the first resource parameter, the first resource to be pre-allocated to the external connection point of the first type.

Optionally, the resource authorization request may further include the type information of the external connection point of the first type. The NFVO may determine, based on the type information of the external connection point of the first type, that the external connection point of the first type needs to be deployed for instantiation of the VNF. In this case, the NFVO directly determines, from the VNFM, that the VNF includes the external connection point of the first type, thereby reducing an amount of processing by the NFVO.

Alternatively, because resource parameters corresponding to different types of external connection points are different, the NFVO may determine, based on the first resource parameter and pre-stored resource parameters corresponding to different types of external connection points, that the external connection point of the first type needs to be deployed for instantiation of the VNF. In this case, the NFVO may not need to receive the type information of the external connection point of the first type from the VNFM. Therefore, an amount of data transmitted between the VNFM and the NFVO can be relatively reduced.

In this embodiment of this application, that the first resource parameter is carried in the resource authorization request is used as an example. In addition, the VNFM may send the first resource parameter to the NFVO via another message. This is not limited in this embodiment of this application.

In step 204 to step 206, that the NFVO receives the first resource parameter from the VNFM is used as an example. In another example, the NFVO may determine the first resource parameter by itself, and the VNFM does not need to send the first resource parameter. In this case, step 204 to step 206 do not need to be performed. For example, the NFVO may determine the first resource parameter from the VNFD. For a manner of determining the first resource parameter by the NFVO, refer to a process of determining the first resource parameter by the VNFM. Details are not listed herein again. In addition, the another resource information may also be determined by the NFVO. For a meaning of the another resource information, refer to the foregoing description.

Step 207: The NFVO determines first resource information based on the first resource parameter. The resource indicated by the first resource information is used to create the external connection point of the first type.

For example, the NFVO manages resource pool information. The resource pool information includes resource information required for creating each type of external connection point in one or more types of external connection points. For example, the resource pool information includes resource information required for creating the external connection point of the load balancer, resource information required for creating the external connection point of the external name, and the like. The NFVO may determine, from the resource pool information, one or more pieces of resource information that meet the first resource parameter, where each piece of resource information in the one or more pieces of resource information indicates a resource required for creating one external connection point of the first type. In this case, the first resource information may include the one or more pieces of resource information. Alternatively, the NFVO may select, from the one or more pieces of resource information, resource information that meets a use condition as the first resource information. The use condition is, for example, resource information that has not been used.

Alternatively, the NFVO may not need to determine the first resource information by itself, but receive the first resource information from another network element. In this case, step 207 may be replaced with that the another network element sends the first resource information to the NFVO, and correspondingly, the NFVO receives the first resource information from the another network element. The another network element is, for example, a network element other than the NFVO in FIG. 1A or FIG. 1B, and is specifically, for example, a VIM. For a manner of determining the first resource information by the another network element, refer to a manner of determining the first resource information by the NFVO.

Certainly, in step 204 to step 207, that the NFVO determines the first resource information based on the first resource parameter is used as an example. In addition to the foregoing manner, the NFVO may further determine the first resource information in another manner. This is not limited in this embodiment of this application. For example, after determining that the VNF includes the external connection point of the first type, the NFVO may determine, from the managed resource pool information, the first resource information required for creating the external connection point of the first type.

In an example, the VNF may include a plurality of external connection points of the first type. In this embodiment of this application, the first resource information determined by the NFVO may indicate, for example, resources pre-allocated to the plurality of external connection points of the first type.

If the first type is different, the first resource information may also be different. The following uses an example for description.

(1) If the first type includes the load balancer, the first resource information includes address information of the external connection point of the load balancer.

The information about the address of the external connection point of the load balancer indicates an address and an address type of the external connection point of the load balancer, for example, an IP address and an IP address type. The IP address type may indicate whether the IP address is a public network address or a private network address.

Optionally, the first resource information further includes information about a function supported by the external connection point of the load balancer. The information about the function supported by the external connection point of the load balancer indicates the function supported by the external connection point of the load balancer.

Table 3 shows an example of the first resource information provided in this embodiment of this application when the first type includes the load balancer.

TABLE 3

| Identifier of an external connection point | Address information of an external connection point | Function information |
|---|---|---|
| LB-1 | IP address type: public network address; IP address: 10.70.36.36 | Support health check and auto scaling |
| LB-2 | IP address type: public network address; IP address: 10.70.36.37 | Support health check and auto scaling |
| . . . | . . . | . . . |
| LB-n | IP address type: private network address; IP address: 192.168.1.1 | Support auto scaling |

Figure 3:
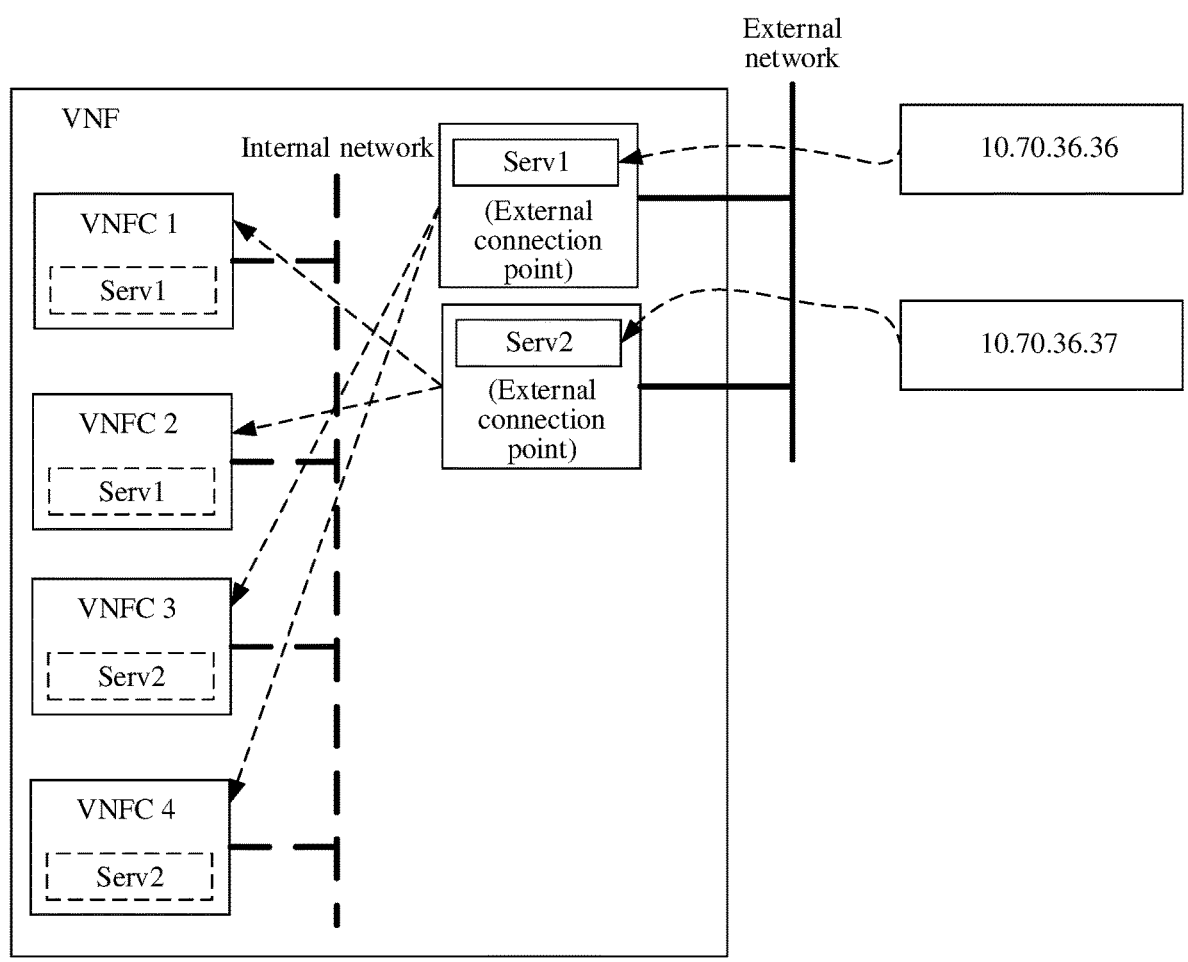
FIG. 3 is a schematic diagram of deploying an external connection point in a VNF according to an embodiment of this application.

For example, FIG. 3 is a schematic diagram of a VNF according to an embodiment of this application. The VNF includes 4 VNFCs (for example, a VNFC1, a VNFC2, a VNFC3, and a VNFC4 shown in FIG. 3). The VNF further includes two external connection points (for example, a Serv1 and a Serv2 shown in FIG. 3). Types of the Serv1 and the Serv2 are both load balancers. Therefore, the NFVO may determine to pre-allocate the first resource information shown in the Table 1 to both the Serv1 and the Serv2.

(2) If the first type includes the external name, the first resource information includes address information of the external connection point of the external name. The information about the address of the external connection point of the external name indicates an address of the external connection point of the external name. For example, the address of the external connection point of the external name includes a name of the external connection point, and includes a name space applicable to the name.

Table 4 shows an example of the first resource information provided in this embodiment of this application when the first type includes the external name.

TABLE 4

| Identifier of an external connection point | Address information of an external connection point |
|---|---|
| name-1 | Name: www.example1.com; Name space: myExample |
| name-2 | Name: www.example2.com; Name space: myExample |
| . . . | . . . |
| name-3 | Name: www.example3.com; Name space: myCompany | myExample and myCompany in the Table 4 are two different name spaces.

(3) If the first type includes the load balancer and the external name, the first resource information includes first resource information of the external connection point of the load balancer and first resource information of the external connection point of the external name. For descriptions of the two types of first resource information, refer to the foregoing description.

Step 208: The NFVO sends the first resource information to the first CISM. Correspondingly, the first CISM receives the first resource information from the NFVO.

The NFV architecture may include one or more CISMs. If there are a plurality of CISMs, the NFVO may determine a first CISM from the plurality of CISMs, and send the first resource information to the first CISM. For example, the NFVO randomly selects a CISM from the plurality of CISMs as the first CISM, or selects a CISM with the lightest load from the plurality of CISMs as the first CISM. If the NFV architecture includes only one CISM, the NFVO directly uses the CISM as the first CISM.

In this case, the first CISM temporarily does not need to create the external connection point of the first type. Therefore, after receiving the first resource information, optionally, the first CISM may store the first resource information, to subsequently use the first resource information.

Step 209: The first CISM sends a receive success response to the NFVO. Correspondingly, the NFVO receives the receive success response from the first CISM.

The receive success response indicates that the first CISM has successfully received the first resource information.

Optionally, the receive success response further includes connection information of the first CISM. The connection information of the first CISM includes, for example, address information of the first CISM. The address information of the first CISM may indicate an address of the first CISM, for example, an IP address of the first CISM. Optionally, the connection information of the first CISM further includes a uniform resource identifier (uniform resource identifier, URL) of the first CISM, and the like.

If the NFV architecture includes only one CISM, the VNFM does not need to create the external connection point of the first type from a specific CISM in the plurality of CISMs subsequently. Therefore, the receive success response may not carry the connection information of the first CISM. In this embodiment of this application, an example in which the receive success response includes the connection information of the first CISM is used.

It should be noted that, in this embodiment of this application, that the receive success response carries the connection information of the first CISM is used as an example. In addition, the first CISM may further send the connection information of the first CISM to the NFVO via another message. This is not limited in this embodiment of this application.

In this embodiment of this application, that the receive success response carries the connection information of the CISM is used as an example. In addition, the first CISM may further send the connection information of the CISM to the NFVO via another message. This is not limited in this embodiment of this application.

Step 210: The NFVO sends a resource authorization response to the VNFM. Correspondingly, the VNFM receives the success response from the NFVO. The resource authorization response includes the connection information of the first CISM.

If the receive success response in step 209 includes the connection information of the first CISM, the resource authorization response in step 210 also includes the connection information of the first CISM. If the receive success response in step 209 does not include the connection information of the first CISM, the resource authorization response in step 210 does not include the connection information of the CISM either.

In this embodiment of this application, that the resource authorization response carries the connection information of the CISM is used as an example. In addition, the NFVO may further send the connection information of the first CISM to the VNFM via another message. This is not limited in this embodiment of this application.

The first resource information may indicate one or more resources. However, which resources in the one or more resources are specifically used by the external connection point of the first type for creating the VNF may be uncertain. Therefore, optionally, the NFVO may further determine second resource information. The second resource information may indicate a resource to be used by the VNFM to create the external connection point of the first type of the VNF. The resource indicated by the second resource information is a subset of the resource indicated by the first resource information. The NFVO may carry the second resource information in the resource authorization response.

In addition, in this embodiment of this application, an example in which the second resource information is sent through the resource authorization response is used. Actually, the NFVO sends the second resource information to the VNFM in a plurality of manners. This is not limited in this application.

Optionally, the NFVO may further mark a status of the resource indicated by the second resource information. For example, the NFVO marks the status of the resource indicated by the second resource information as used, so that the NFVO subsequently determines, based on the status, which resources indicated by the first resource information is used.

Step 211: The VNFM sends a resource creation request to the first CISM. Correspondingly, the first CISM receives the resource creation request from the VNFM. The resource creation request is used to request to create the external connection point of the first type.

If the NFV architecture includes one CISM, the VNFM directly uses the CISM as the first CISM, and sends a resource creation request to the first CISM. Alternatively, if the NFV architecture includes a plurality of CISMs, the VNFM may determine, from the plurality of CISMs based on the address information of the first CISM, the first CISM used to create the external connection point of the first type.

If the VNFM receives the second resource information from the NFVO, optionally, the VNFM may carry the second resource information in the resource creation request, to indicate, through the second resource information, a resource required for creating the external connection point of the first type.

Optionally, the resource creation request may further indicate to create a container required for instantiating the VNF. In an implementation, the VNFM may determine, based on the another resource information, the resource information required by the container that is created, and carry, in the resource creation request, the resource information required by the container that is created. For a meaning of the another resource information, refer to the foregoing description.

Alternatively, the resource creation request may not need to indicate to create a container required for instantiating the VNF. The VNFM may send the container creation request to the first CISM. Correspondingly, the first CISM receives the container creation request from the VNFM. The container creation request may indicate the first CISM to create the container required for instantiating the VNF. Optionally, the container creation request includes resource information required by the container that is created. If the VNFM further sends the container creation request to the first CISM, the VNFM may first send the resource creation request and then send the container creation request. Alternatively, the VNFM may first send the container creation request and then send the resource creation request. Alternatively, the VNFM may send the two messages at the same time.

Step 212: The first CISM creates a container.

The first CISM may determine, based on the request from the VNFM, a container to be created, and the first CISM may create the container. For example, the first CISM deploys a container on a physical machine or a virtual machine in the NFVI. Optionally, the first CISM may further deploy the VNFC in the container, to instantiate the VNF. For example, the first CISM includes a first application programming interface configured to create a container. The CISM may invoke the first application programming interface (API) to create the container based on a resource indicated by another resource information. For example, the CISM may invoke the first application programming interface to access the physical machine or the virtual machine in the NFVI based on the another resource information, to deploy the container on the physical machine or the virtual machine in the NFVI.

Optionally, after creating the container, the first CISM may feedback a container creation success response to the VNFM. The container creation success response indicates that the first CISM successfully creates the container.

Step 213: The first CISM creates the external connection point of the first type, and allocates a partial of or the entire of the resource indicated by the first resource information to the external connection point of the first type.

If the first CISM deploys the container on the physical machine, the first CISM may also deploy the external connection point of the first type on the physical machine, and allocate the partial of or the entire of the resource indicated by the first resource information to the external connection point of the first type. If the CISM deploys the container on the virtual machine, the first CISM may alternatively deploy the external connection point of the first type on the virtual machine, and allocate the partial of or the entire of the resource indicated by the first resource information to the external connection point of the first type.

For example, the first CISM includes a second application programming interface configured to create the external connection point. The first CISM may invoke the second application programming interface to create the external connection point of the first type. For example, the first CISM may invoke the second application programming interface to access the physical machine or the virtual machine in the NFVI, to deploy the external connection point of the first type on the physical machine or the virtual machine in the NFVI. The second application programming interface may be a same application programming interface as the first application programming interface described above, or may be a different application programming interface.

Continue to use FIG. 3 as an example. After receiving the resource creation request, the first CISM determines that the resource creation request does not include the second resource information. Therefore, the first CISM may randomly determine two IP addresses (for example, 10.70.36.36 and 10.70.36.37) from the first resource information shown in Table 3, and allocate the two IP addresses to the Serv1 and the Serv2. For example, the first CISM allocates the IP address (10.70.36.36) to the Serv1 and allocates the IP address 10.70.36.37 to the Serv2.

If the resource creation request does not include the second resource information, the first CISM may allocate the partial of or the entire of the resource indicated by the first resource information to the external connection point of the first type. For example, the first CISM may randomly select the partial of the resource from the entire of the resource indicated by the first resource information, and allocate the resource to the external connection point of the first type.

Alternatively, if the resource creation request includes the second resource information, the first CISM may allocate the entire of the resource indicated by the second resource information to the external connection point of the first type.

On one hand, theoretically, the NFVO determines, for the VNF, the second resource information that indicates the subset of the resource indicated by the first resource information. However, it is difficult to ensure that no error occurs in a process in which the VNFM forwards the second resource information. For example, the VNFM confuses the second resource information of the VNF with second resource information of another VNF. On the other hand, the VNFM cannot obtain the first resource information from the NFVO or another network element. As a result, the VNFM cannot verify the resource indicated by the second resource information. Therefore, in this embodiment of this application, optionally, the first CISM may verify the resource indicated by the second resource information, to improve correctness of the resource indicated by the second resource information. For example, the first CISM may determine whether the resource indicated by the second resource information is a subset of the resource indicated by the first resource information, to determine whether the resource indicated by the second resource information is correct. The first CISM determines whether the resource indicated by the second resource information is a subset of the resource indicated by the first resource information. A result of determination may include the following several types.

A first type of result of determination is that the entire of the resource indicated by the second resource information is a subset of the resource indicated by the first resource information.

This type of result of determination indicates that the entire of the resource indicated by the second resource information is correct, and the first CISM may allocate the resource indicated by the second resource information to the external connection point of the first type.

For example, the first resource information is shown in Table 4, and the second resource information includes: an identifier of the external connection point is name-3, address information of the external connection point includes a name www.example 3.com, and a name space is myCompany. If the first CISM determines that the resource indicated by the second resource information belongs to the resource indicated by the first resource information, the first CISM determines that the resource indicated by the second resource information is correct.

A second type of result of determination is that the partial of the resource indicated by the second resource information is a subset of the resource indicated by the first resource information, and another partial of the resource indicated by the second resource information does not belong to the resource indicated by the first resource information.

This type of result of determination indicates that the partial of the resource indicated by the second resource information is correct, and the first CISM may allocate the resource indicated by the second resource information that is correct to the external connection point of the first type. Alternatively, the first CISM may directly allocate the partial of or the entire of the resource indicated by the first resource information to the external connection point of the first type, without considering the second resource information.

A third type of result of determination is that none of the resource indicated by the second resource information is included in the resource indicated by the first resource information. Alternatively, there is no intersection between the resource indicated by the second resource information and the resource indicated by the first resource information.

This first type of result of determination indicates that none of the resource indicated by the second resource information is correct. The first CISM may allocate the partial of or the entire of the resource indicated by the first resource information to the external connection point of the first type, without considering the second resource information. Alternatively, the first CISM may send a creation failure response to the VNFM. Correspondingly, the VNFM receives the creation failure response from the first CISM. The creation failure response indicates that the external connection point of the first type is unsuccessfully created. In this case, step 201 to step 213 may be repeatedly performed, to recreate the external connection point of the first type.

Step 214: The first CISM sends a creation success response to the VNFM. Correspondingly, the VNFM receives the creation success response from the first CISM. The creation success response indicates that the external connection point of the first type has been successfully created.

If the external connection point of the first type is successfully created, the first CISM may generate a creation success response, and send the creation success response to the VNFM. For example, the creation success response includes the identifier of the VNF instance.

Optionally, the first CISM may send, to the OSS, information about the external connection point of the first type that is created and the identifier of the VNF instance. The first CISM may actively send the information about the external connection point of the first type and the identifier of the VNF instance to the OSS. For example, the first CISM may periodically or irregularly send the information. Alternatively, the first CISM may not actively send the information. Instead, the OSS may periodically or irregularly request, from the first CISM, the information about the external connection point of the first type and the identifier of the VNF instance corresponding to the external connection point of the first type. The information about the external connection point of the first type includes, for example, the address information of the external connection point of the first type. For example, continue to use FIG. 3 as an example. The first CISM may send the identifier of the VNF instance to the OSS, and send the IP address (10.70.36.36) of the Serv1 and the IP address (10.70.36.37) of the Serv2.

The OSS may expose, to the external node, the information about the external connection point of the first type and the identifier of the VNF instance corresponding to the external connection point of the first type, so that the external node accesses the VNF based on the information about the external connection point of the first type.

Step 215: The VNFM sends an instantiation success response to the NFVO. Correspondingly, the NFVO receives the creation success response from the VNFM. The instantiation success response indicates that the VNF has been successfully instantiated.

If the VNFM determines that the external connection point of the first type is successfully created, and the container and the like are successfully deployed, the VNFM may generate an instantiation success response. For example, the instantiation success response carries the identifier of the VNF instance. After receiving the instantiation success response, the NFVO determines that the VNF has been successfully instantiated.

Step 201 to step 206, step 209 to step 210, step 212, and step 214 to step 215 are optional steps. These optional steps are illustrated by dashed lines in FIG. 2.

In this embodiment of this application, the VNFM may determine whether the current to-be-instantiated VNF involves the first resource parameter of the external connection point of the first type. Because the NFVO does not need to determine the first resource parameter, an amount of processing by the NFVO is relatively reduced. The NFVO receives the first resource parameter from the VNFM, determines the first resource information of the external connection point of the first type based on the first resource parameter, and sends the first resource information to the CISM. The CISM may allocate, to the external connection point of the first type, a partial of or the entire of the resource indicated by the first resource information. A mechanism of creating a load balancer and/or an external name as the external connection point is provided. In addition, more types of external connection points can be deployed in the VNF, thereby extending a service range to which the VNF can be applied. In addition, because resources required for creating different types of external connection points are different, different resources may be used to create different types of external connection points, thereby improving flexibility for deploying an external connection point in a VNF.

Figure 4:
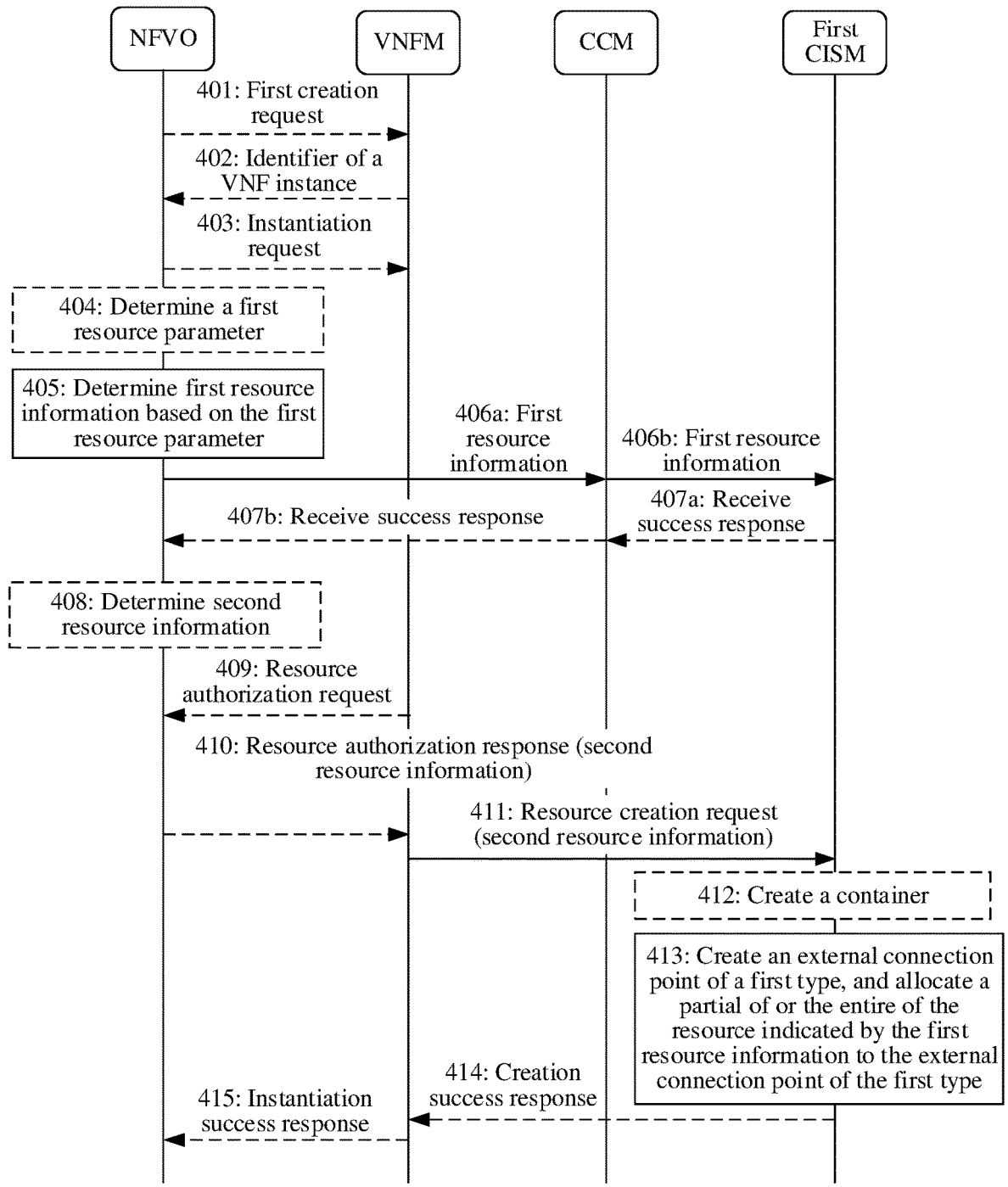
FIG. 4 is another schematic flowchart of a method for deploying a virtualized network function according to an embodiment of this application.

The following describes the method by using an example with reference to a flowchart of a method for deploying a virtualized network function shown in FIG. 4. In description of the process in FIG. 4, the communication system shown in FIG. 1D is used as an example of the communication system, and the communication system is deployed in the NFV architecture shown in FIG. 1A.

Step 401: An NFVO sends a first creation request to a VNFM. Correspondingly, the VNFM receives the first creation request from the NFVO. For content of the first creation request, refer to the foregoing description.

Step 402: The VNFM sends the identifier of the VNF instance to the NFVO. Correspondingly, the NFVO receives the identifier of the VNF instance from the VNFM. For content of the identifier of the VNF instance, refer to the foregoing description.

Step 403: The NFVO sends an instantiation request to the VNFM. Correspondingly, the VNFM receives the instantiation request from the NFVO. For content of the instantiation request, refer to the foregoing description.

Step 404: The NFVO determines a first resource parameter.

The NFVO may determine the first resource parameter based on a pre-configured VNFD, or the NFVO may be pre-configured with the first resource parameter. For a manner of determining the first resource parameter by the NFVO based on the VNFD, a meaning of the VNFD, and content of the first resource parameter, refer to the foregoing description.

Step 405: The NFVO determines first resource information based on the first resource parameter.

For a manner of determining the first resource information by the NFVO and a meaning of the first resource information, refer to the foregoing description.

It should be noted that in this embodiment of this application, that the NFVO determines the first resource information based on the first resource parameter is used as an example. However, actually, the NFVO may determine the first resource information without using the first resource parameter. This is not limited in this embodiment of this application.

Step 406: The NFVO sends the first resource information to the first CISM through the CCM. Correspondingly, the first CISM receives the first resource information from the NFVO through the CMM. For a meaning of the first resource information, refer to the foregoing description.

Specifically, step 406 includes step 406a and step 406b. Step 406a: The NFVO sends the first resource information to the CCM. Correspondingly, the CCM receives the first resource information from the NFVO. Step 406b: The CCM sends the first resource information to the first CISM. Correspondingly, the first CISM receives the first resource information from the CCM.

For a manner of determining the first CISM by the NFVO, refer to the foregoing description.

It should be noted that in this embodiment of this application, that the NFVO sends the first resource information to the first CISM through the CCM is used as an example. In addition, the NFVO sends the first resource information to the first CISM in a plurality of manners. This is not limited in this embodiment of this application.

Step 407: The first CISM sends a receive success response to the NFVO through the CCM. Correspondingly, the NFVO receives the receive success response from the first CISM through the CCM.

Specifically, step 407 includes step 407a and step 407b. Step 407a: The first CISM sends the receive success response to the CCM. Correspondingly, the CCM receives the receive success response from the first CISM. Step 407b: The CCM sends the receive success response to the NFVO. Correspondingly, the NFVO receives the receive success response from the CCM.

Optionally, the receive success response includes connection information of the first CISM. For meanings of the receive success response and the connection information of the first CISM, refer to the foregoing description.

It should be noted that, in this embodiment of this application, that the first CISM sends the receive success response to the NFVO through the CCM is used as an example. In addition, the first CISM sends the receive success response to the NFVO through the CCM in a plurality of manners. This is not limited in this embodiment of this application.

Step 408: The NFVO determines second resource information.

For a meaning of the second resource information and a manner of determining the second resource information, refer to the foregoing description.

Step 409: The VNFM sends a resource authorization request to the NFVO. Correspondingly, the NFVO receives the resource authorization request from the VNFM.

For a meaning of the resource authorization request, refer to the foregoing description.

Optionally, the NFVO may first determine the second resource information, and then the VNFM sends the resource authorization request to the NFVO. Alternatively, the VNFM may first send the resource authorization request to the NFVO, and then the NFVO determines the second resource information. Alternatively, the NFVO determines the second resource information while the VNFM sends the resource authorization request to the NFVO.

Step 410: The NFVO sends a resource authorization response to the VNFM. Correspondingly, the VNFM receives the resource authorization response from the NFVO.

Optionally, the resource authorization response includes the connection information of the first CISM and/or the second resource information. For meanings of the second resource information and the connection information of the first CISM, refer to the foregoing description.

Step 411: The VNFM sends a resource creation request to the first CISM. Correspondingly, the first CISM receives the resource creation request from the VNFM.

For a meaning of the resource creation request, refer to content described in FIG. 2.

Optionally, the resource creation request includes the second resource information. In this embodiment of this application, an example in which the resource creation request includes the second resource information is used.

Step 412: The first CISM creates a container.

For details about how the CISM creates a container, refer to the foregoing description.

Step 413: The first CISM creates the external connection point of the first type, and allocates a partial of or the entire of the resource indicated by the first resource information to the external connection point of the first type.

Optionally, after receiving the second resource information, the first CISM may verify correctness of the resource indicated by the second resource information. For details about the verification method and possible verification results, refer to the foregoing description.

Optionally, the first CISM may send, to the OSS, information about the external connection point of the first type that is created and the identifier of the VNF instance. For a manner in which the first CISM sends the information to the OSS, refer to the foregoing description. The OSS may expose, to the external node, the information about the external connection point of the first type and the identifier of the VNF instance corresponding to the external connection point of the first type, so that the external node accesses the VNF based on the information about the external connection point of the first type.

Step 414: The first CISM sends a creation success response to the VNFM. Correspondingly, the VNFM receives the creation success response from the first CISM.

For a meaning of the creation success response, refer to the foregoing description.

Step 415: The VNFM sends an instantiation success response to the NFVO. Correspondingly, the NFVO receives the instantiation success response from the VNFM. For a meaning of the instantiation success response, refer to the foregoing description.

In an example, step 401 to step 404, step 407 to step 410, step 412, and step 414 to step 415 are optional steps. These optional steps are illustrated by dashed lines in FIG. 4.

In this embodiment of this application, the NFVO determines the first resource information of the external connection point of the first type, and sends the first resource information to the CISM. The CISM may allocate, to the external connection point of the first type, a partial of or the entire of the resource indicated by the first resource information. A mechanism of deploying services of a load balancer and/or an external name in the VNF to serve as external connection points is provided. In addition, service ranges that can be supported by different types of external connection points may be different, and the VNF may support deployment of more types of external connection points; therefore, the service range supported by the VNF can be extended. In addition, the NFVO may determine the first resource parameter by itself, to determine the first resource information based on the first resource parameter. The VNFM does not need to determine the first resource parameter, thereby reducing an amount of processing by the VNFM. In addition, compared with that the VNFM does not need to send the first resource parameter to the NFVO, interaction between the VNFM and the NFVO is reduced.

Figure 5:
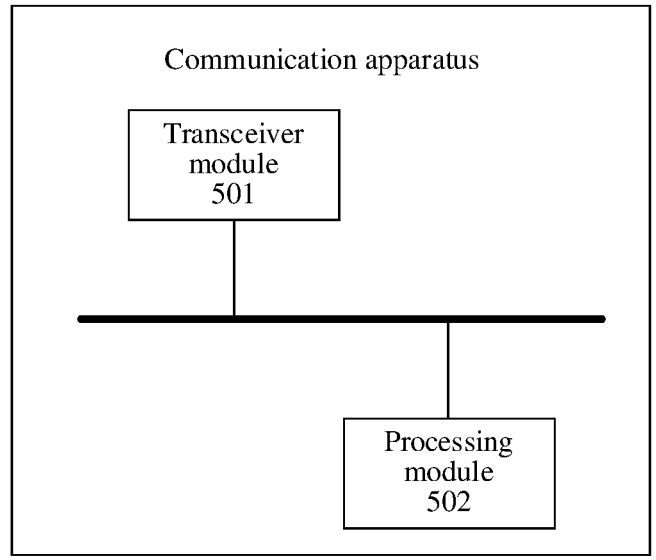
FIG. 5 is a schematic diagram 1 of a structure of a communication apparatus according to an embodiment of this application.

Based on a same inventive concept, an embodiment of this application further provides a communication apparatus. FIG. 5 is a schematic diagram of a structure of a communication apparatus according to an embodiment of this application. The communication apparatus shown in FIG. 5 may be configured to implement functions of the first network element in the foregoing method embodiments, and therefore can also achieve beneficial effects of the foregoing method embodiments. In this embodiment of this application, the communication apparatus shown in FIG. 5 may be a chip system with a CISM function.

As shown in FIG. 5, the communication apparatus includes a transceiver module 501 and a processing module 502.

In an embodiment, the communication apparatus may be configured to implement functions of the CISM in the method embodiment shown in FIG. 2 or FIG. 4. For a specific function, refer to the description in the foregoing method embodiments. For example, the communication apparatus may be configured to implement functions of the CISM in the method embodiment shown in FIG. 2 or FIG. 4.

Figure 6:
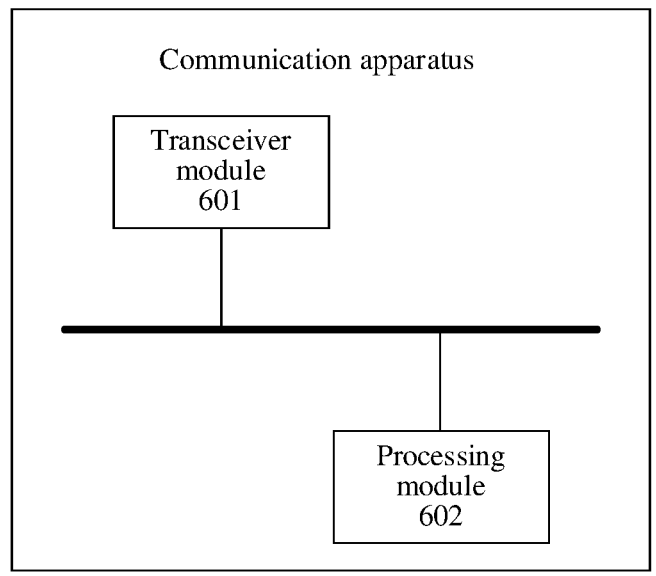
FIG. 6 is a schematic diagram 2 of a structure of a communication apparatus according to an embodiment of this application.

Based on a same inventive concept, an embodiment of this application further provides a communication apparatus. FIG. 6 is a schematic diagram of a structure of a communication apparatus according to an embodiment of this application. The communication apparatus shown in FIG. 6 may be configured to implement functions of the first network element in the foregoing method embodiments, and therefore can also achieve beneficial effects of the foregoing method embodiments. In this embodiment of this application, the communication apparatus shown in FIG. 6 may be a chip system with an NFVO function.

As shown in FIG. 6, the communication apparatus includes a transceiver module 601 and a processing module 602.

In an embodiment, the communication apparatus may be configured to implement functions of the NFVO in the method embodiment shown in FIG. 2 or FIG. 4. For a specific function, refer to the description in the foregoing method embodiments. For example, the communication apparatus may be configured to implement functions of the NFVO in the method embodiment shown in FIG. 2 or FIG. 4.

Figure 7:
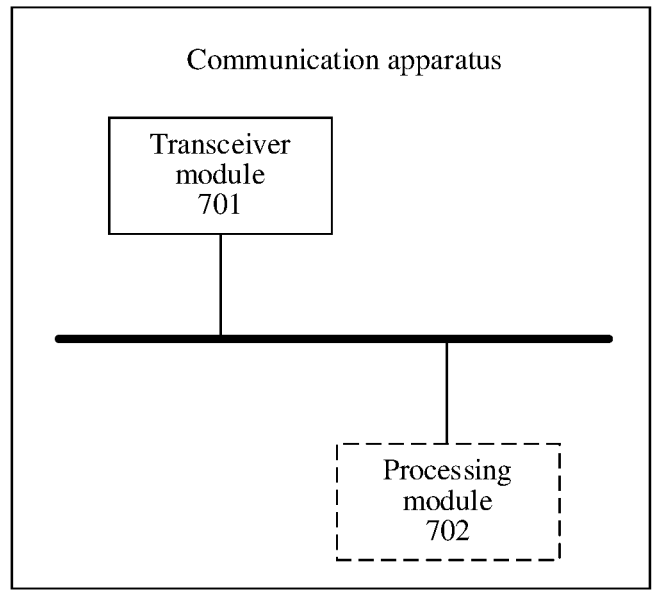
FIG. 7 is a schematic diagram 3 of a structure of a communication apparatus according to an embodiment of this application.

Based on a same inventive concept, an embodiment of this application further provides a communication apparatus. FIG. 7 is a schematic diagram of a structure of a communication apparatus according to an embodiment of this application. The communication apparatus shown in FIG. 7 may be configured to implement functions of the first network element in the foregoing method embodiments, and therefore can also achieve beneficial effects of the foregoing method embodiments. In this embodiment of this application, the communication apparatus shown in FIG. 7 may be a chip system with functions of a container as a service manager.

As shown in FIG. 7, the communication apparatus includes a transceiver module 701. Optionally, the communication apparatus further includes a processing module 702. In FIG. 7, a dashed box indicates that the processing module 702 is an optional module.

In an embodiment, the communication apparatus may be configured to implement functions of the VNFM in the method embodiment shown in FIG. 2. For a specific function, refer to the description in the method embodiment. For example, the communication apparatus may be configured to implement functions of the VNFM in the method embodiment shown in FIG. 2.

Figure 8:
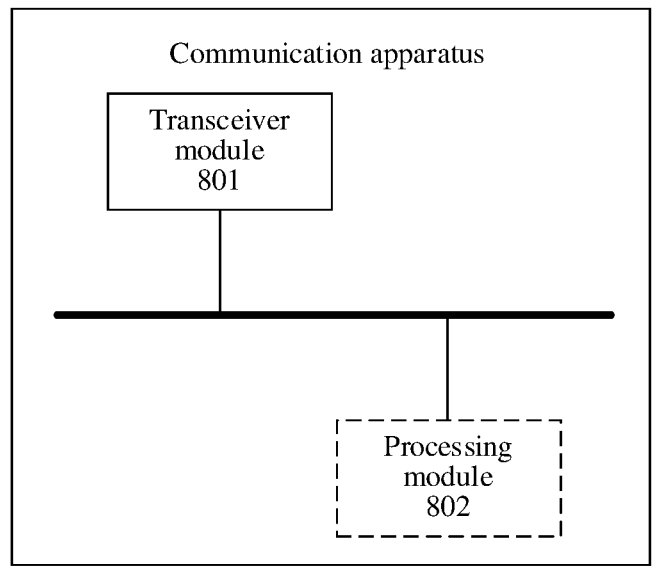
FIG. 8 is a schematic diagram 4 of a structure of a communication apparatus according to an embodiment of this application.

Based on a same inventive concept, an embodiment of this application further provides a communication apparatus. FIG. 8 is a schematic diagram of a structure of a communication apparatus according to an embodiment of this application. The communication apparatus shown in FIG. 8 may be configured to implement functions of the VNFM in the foregoing method embodiments, and therefore can also achieve beneficial effects of the foregoing method embodiments. In this embodiment of this application, the communication apparatus shown in FIG. 8 may be a chip system with a VNFM function.

As shown in FIG. 8, the communication apparatus includes a transceiver module 801. Optionally, the communication apparatus further includes a processing module 802. In FIG. 8, a dashed box indicates that the processing module 802 is an optional module.

In an embodiment, the communication apparatus may be configured to implement functions of the VNFM in the method embodiment shown in FIG. 4. For a specific function, refer to the description in the method embodiment. For example, the communication apparatus may be configured to implement functions of the VNFM in the method embodiment shown in FIG. 4.

Figure 9:
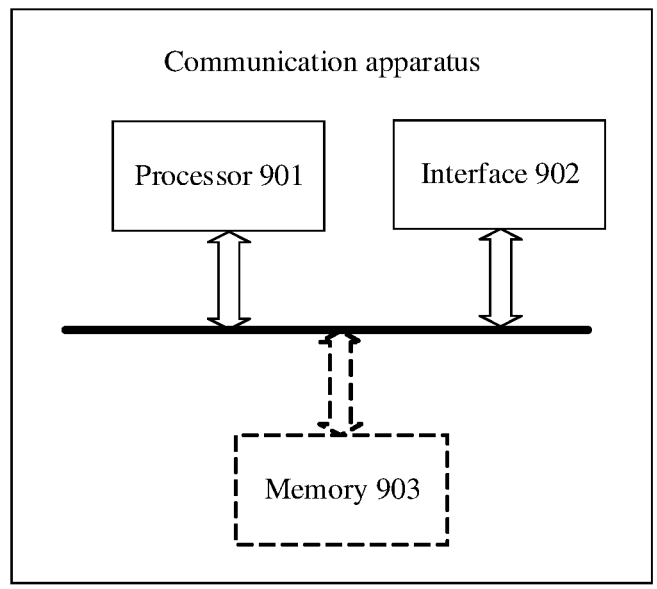
FIG. 9 is a schematic diagram 5 of a structure of a communication apparatus according to an embodiment of this application.

Based on a same inventive concept, an embodiment of this application further provides a communication apparatus. FIG. 9 is a schematic diagram of a structure of a communication apparatus according to an embodiment of this application. The communication apparatus shown in FIG. 9 may be configured to implement functions of the first network element in the foregoing method embodiments, and therefore can also achieve beneficial effects of the foregoing method embodiments.

As shown in FIG. 9, the communication apparatus includes a processor 901 and an interface 902. The processor 901 and the interface 902 are coupled to each other. It may be understood that the interface 902 may be a transceiver or an input/output interface.

The communication apparatus may include one or more processors 901. The processor 901 may also be referred to as a processing unit, and may implement a specific control function. The processor 901 may be a general-purpose processor or a dedicated processor or the like, for example, including a baseband processor, a central processing unit, and the like. The baseband processor may be configured to process a communication protocol and communication data. The central processing unit may be configured to control the communication apparatus, execute a software program, and/or process data. Different processors may be independent components, or may be disposed in one or more processing circuits, for example, integrated into one or more application-specific integrated circuits.

Optionally, the communication apparatus includes one or more memories 903, configured to store instructions. The instructions may be run on the processor, so that the communication apparatus performs the method described in the foregoing method embodiments. The memory 903 in the communication apparatus is an optional component, and is shown by using a dashed box in FIG. 9.

Optionally, the memory 903 may further store data. The processor and the memory may be separately arranged, or may be integrated together.

Optionally, the communication apparatus may further include a memory 903, configured to store instructions executed by the processor 901, or store input data required by the processor 901 to run the instructions, or store data generated after the processor 901 runs the instructions.

In an embodiment, when the communication apparatus is configured to implement the method embodiment shown in FIG. 2 or FIG. 4, the communication apparatus may be configured to implement functions of the CISM in the method embodiment shown in FIG. 2 or FIG. 4. For a specific function, refer to the description in the foregoing method embodiments. In this case, the communication apparatus may further implement functions of the communication apparatus shown in FIG. 5.

In an embodiment, when the communication apparatus is configured to implement the method embodiment shown in FIG. 2 or FIG. 4, the communication apparatus may be configured to implement functions of the NFVO in the method embodiment shown in FIG. 2 or FIG. 4. For a specific function, refer to the description in the foregoing method embodiments. In this case, the communication apparatus may further implement functions of the communication apparatus shown in FIG. 6.

In an embodiment, when the communication apparatus is configured to implement the method embodiment shown in FIG. 2, the communication apparatus may be configured to implement functions of the VNFM in the method embodiment shown in FIG. 2. For a specific function, refer to the description in the foregoing method embodiments. In this case, the communication apparatus may further implement functions of the communication apparatus shown in FIG. 7.

In an embodiment, when the communication apparatus is configured to implement the method embodiment shown in FIG. 4, the communication apparatus may be configured to implement functions of the VNFM in the method embodiment shown in FIG. 4. For a specific function, refer to the description in the foregoing method embodiments. In this case, the communication apparatus may further implement functions of the communication apparatus shown in FIG. 8.

Based on a same inventive concept, an embodiment of this application further provides a communication system. The communication system may include the communication apparatus shown in FIG. 5, the communication apparatus shown in FIG. 6, and the communication apparatus shown in FIG. 7.

Based on a same inventive concept, an embodiment of this application further provides a communication system. The communication system may include the communication apparatus shown in FIG. 5, the communication apparatus shown in FIG. 6, and the communication apparatus shown in FIG. 8.

Based on a same inventive concept, an embodiment of this application provides a computer-readable storage medium, where the computer-readable storage medium is configured to store a computer program, and when the computer program runs on a computer, the computer is enabled to perform the method according to any one of FIG. 2 or FIG. 4.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more procedures in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may alternatively be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   determining first resource information, wherein the first resource information indicates a resource pre-allocated to an external connection point of a first type, the external connection point is an ingress for accessing a virtualized network function (VNF) by an external node, and the first type is a load balancer type or an external name type; and
   sending the first resource information to a container infrastructure service management (CISM), wherein the resource indicated by the first resource information is used to create the external connection point of the first type.

2. The method according to claim 1, wherein the first resource information comprises information about an address allocated to the external connection point of the first type.

3. The method according to claim 2, wherein the first resource information further comprises information about a function supported by the external connection point of the first type.

4. The method according to claim 1, wherein determining the first resource information comprises:
   sending an instantiation request to a virtualized network function manager (VNFM), wherein the instantiation request requests to instantiate the VNF;
   receiving a resource authorization request from the VNFM, wherein the resource authorization request comprises a first resource parameter; and
   determining the first resource information based on the first resource parameter.

5. The method according to claim 1, wherein determining the first resource information comprises:
   determining a first resource parameter from a virtualized network function descriptor (VNFD) corresponding to the VNF, wherein the first resource parameter is used to determine the first resource information, and the VNFD comprises type information of a plurality of external connection points of the VNF and a resource parameter corresponding to each type of the plurality of external connection points; and
   determining the first resource information based on the first resource parameter.

6. The method according to claim 1, further comprising:
   sending second resource information to a virtualized network function manager (VNFM), wherein a resource indicated by the second resource information is a subset of the resource indicated by the first resource information, and the resource indicated by the second resource information is used to create the external connection point of the first type.

7. The method according to claim 1, further comprising:
   receiving, from the CISM, address information of the CISM through a container cluster manager (CCM); or
   receiving, from the CISM, address information of the CISM; and
   sending the address information of the CISM to a virtualized network function manager (VNFM), wherein the address information of the CISM indicates the CISM that creates the external connection point of the first type.

8. The method according to claim 4, further comprising:
   receiving the instantiation request; and
   sending the resource authorization request to a network functions virtualization orchestrator (NFVO), wherein the resource authorization request comprises a first resource parameter, and the first resource parameter is used to determine the first resource information.

9. The method according to claim 1, further comprising:
   receiving the first resource information; and
   creating the external connection point of the first type, and allocating a partial of or the entire of the resource indicated by the first resource information to the external connection point of the first type.

10. A method, comprising:
    receiving an instantiation request from a network functions virtualization orchestrator (NFVO), wherein the instantiation request requests to instantiate a virtualized network function (VNF); and
    sending a resource authorization request to the NFVO, wherein the resource authorization request comprises a first resource parameter, the first resource parameter is used to determine first resource information, the first resource information indicates a resource pre-allocated to an external connection point of a first type, and the external connection point is an ingress for accessing the VNF by an external node.

11. The method according to claim 10, further comprising:
determining the first resource parameter from a virtualized network function descriptor (VNFD) corresponding to the VNF, wherein the first resource parameter is used to determine the first resource information, and the VNFD comprises type information of a plurality of external connection points of the VNF and a resource parameter corresponding to each type of the plurality of external connection points.

12. The method according to claim 10, further comprising:
receiving second resource information from the NFVO, wherein the second resource information indicates the resource pre-allocated to the external connection point of the first type, and the first type is a load balancer type or an external name type; and
sending the second resource information to a container infrastructure service management (CISM), wherein the resource indicated by the second resource information is used to create the external connection point of the first type.

13. An apparatus, comprising:
a transmitter;
at least one processor; and
a non-transitory computer readable storage medium storing instructions that are executable by the at least one processor, the instructions comprising instructions to:
determine first resource information, wherein the first resource information indicates a resource pre-allocated to an external connection point of a first type, the external connection point is an ingress for accessing a virtualized network function (VNF) by an external node, and the first type is a load balancer type or an external name type; and
send the first resource information to a container infrastructure service management (CISM), wherein the resource indicated by the first resource information is used to create the external connection point of the first type.

14. The apparatus according to claim 13, wherein the first resource information comprises information about an address allocated to the external connection point of the first type.

15. The apparatus according to claim 14, wherein the first resource information further comprises information about a function supported by the external connection point of the first type.

16. The apparatus according to claim 13, wherein the instructions further comprise instructions to:
send an instantiation request to a virtualized network function manager (VNFM), wherein the instantiation request requests to instantiate the VNF;
receive a resource authorization request from the VNFM, wherein the resource authorization request comprises a first resource parameter; and
determine the first resource information based on the first resource parameter.

17. The apparatus according to claim 13, wherein the instructions further comprise instructions to:
determine a first resource parameter from a virtualized network function descriptor (VNFD) corresponding to the VNF, wherein the first resource parameter is used to determine the first resource information, and the VNFD comprises type information of a plurality of external connection points of the VNF and a resource parameter corresponding to each type of the plurality of external connection points; and
determine the first resource information based on the first resource parameter.

18. A communication apparatus, comprising:
at least one processor; and
a non-transitory computer readable storage medium storing instructions that are executable by the at least one processor, the instructions comprising instructions to:
receive an instantiation request from a network functions virtualization orchestrator (NFVO), wherein the instantiation request requests to instantiate a virtualized network function (VNF); and
send a resource authorization request to the NFVO, wherein the resource authorization request comprises a first resource parameter, the first resource parameter is used to determine first resource information, the first resource information indicates a resource pre-allocated to an external connection point of a first type, and the external connection point is an ingress for accessing the VNF by an external node.

19. The apparatus according to claim 18, wherein the instructions further comprise instructions to:
determine the first resource parameter from a virtualized network function descriptor (VNFD) corresponding to the VNF, wherein the VNFD comprises type information of a plurality of external connection points of the VNF and a resource parameter corresponding to each type of the plurality of external connection points.

20. The apparatus according to claim 18, wherein the instructions further comprise instructions to:
receive second resource information from the NFVO, wherein the second resource information indicates the resource pre-allocated to the external connection point of the first type, and the first type is a load balancer type or an external name type; and
send the second resource information to a container infrastructure service management (CISM), wherein the resource indicated by the second resource information is used to create the external connection point of the first type.

* * * * *